(12) United States Patent
Lim et al.

(10) Patent No.: US 12,497,636 B2
(45) Date of Patent: *Dec. 16, 2025

(54) RECOMBINANT Saccharomyces cerevisiae CELLS FOR CANNABINOID PRODUCTION

(71) Applicant: National University of Singapore, Singapore (SG)

(72) Inventors: Kevin Jie Han Lim, Singapore (SG); Maybelle Darlene Kho Go, Singapore (SG); Wen Shan Yew, Singapore (SG)

(73) Assignee: National University of Singapore, Singapore (SG)

( * ) Notice: Subject to any disclaimer, the term of this patent is extended or adjusted under 35 U.S.C. 154(b) by 532 days.

This patent is subject to a terminal disclaimer.

(21) Appl. No.: 17/767,957

(22) PCT Filed: Oct. 12, 2020

(86) PCT No.: PCT/SG2020/050584
§ 371 (c)(1),
(2) Date: Apr. 11, 2022

(87) PCT Pub. No.: WO2021/071439
PCT Pub. Date: Apr. 15, 2021

(65) Prior Publication Data
US 2024/0093253 A1  Mar. 21, 2024

Related U.S. Application Data

(60) Provisional application No. 62/914,058, filed on Oct. 11, 2019.

(51) Int. Cl.
| | | |
|---|---|---|
| *C12P 17/06* | (2006.01) | |
| *C12N 9/00* | (2006.01) | |
| *C12N 9/10* | (2006.01) | |
| *C12N 9/88* | (2006.01) | |
| *C12N 15/52* | (2006.01) | |
| *C12N 15/81* | (2006.01) | |

(52) U.S. Cl.
CPC ........... *C12P 17/06* (2013.01); *C12N 9/1029* (2013.01); *C12N 9/1085* (2013.01); *C12N 9/88* (2013.01); *C12N 9/93* (2013.01); *C12N 15/52* (2013.01); *C12N 15/81* (2013.01); *C12Y 203/01086* (2013.01); *C12Y 203/01206* (2015.07); *C12Y 205/01039* (2013.01); *C12Y 404/01026* (2015.07); *C12Y 602/01012* (2013.01); *C12Y 602/01025* (2013.01); *C12Y 602/0103* (2013.01); *C12N 2800/102* (2013.01)

(58) Field of Classification Search
None
See application file for complete search history.

(56) References Cited

U.S. PATENT DOCUMENTS

2008/0274478 A1    11/2008    Kuzuyama et al.

FOREIGN PATENT DOCUMENTS

| | | |
|---|---|---|
| CN | 101137663 A | 3/2008 |
| CN | 105555265 A | 5/2016 |
| WO | WO-2006/081537 A2 | 8/2006 |
| WO | WO-2018/200888 A1 | 11/2018 |
| WO | WO 2018-209143 A1 | 11/2018 |
| WO | WO-2019/014490 A1 | 1/2019 |
| WO | WO 2019-071000 A1 | 4/2019 |
| WO | WO 2019-183152 A1 | 9/2019 |
| WO | WO-2019/190945 A1 | 10/2019 |

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Kizer et al. Appl Environ Microbiol. May 2008;74(10):3229-41. (Year: 2008).*
Prather et al. Curr Opin Biotechnol. Oct. 2008;19(5):468-74. (Year: 2008).*
Accession Q4R2T2. Jul. 19, 2005 (Year: 2005).*
Bastian, et al., Engineering Yeasts as Platform Organisms for Cannabinoid Biosynthesis, Journal of Biotechnology, Jul. 8, 2017, pp. 204-212, Elsevier Amsterdam, NL.

* cited by examiner

*Primary Examiner* — Christian L Fronda
(74) *Attorney, Agent, or Firm* — Cesari and McKenna, LLP

(57) ABSTRACT

A recombinant cell of *Saccharomyces cerevisiae* that includes in its genome nucleic acids encoding cannabinoid biosynthetic pathway genes. A cannabinoid is produced by the recombinant cell in the presence of a cannabinoid precursor substrate and at least one of the cannabinoid biosynthetic pathway genes is from an organism other than *Cannabis sativa*, wherein the at least one of the cannabinoid biosynthetic pathway genes encodes a prenyltransferase. In an embodiment, the prenyltransferase is NphB from *Streptomyces* sp. having the amino acid sequence of any one of SEQ ID NOs: 8-11. Also disclosed is a method for producing a cannabinoid with the recombinant cell and the cannabinoid precursor substrate.

6 Claims, 10 Drawing Sheets

Specification includes a Sequence Listing.

| Vector | Prefix | Suffix | | | | | | |
|---|---|---|---|---|---|---|---|---|
| POT1 | ACCT | TGAG | | | | | | |
| POT2 | ACCT | AGGC | | | | | | |
| POT3 | | AGGC | TGAG | | | | | |
| POT4 | | AGGC | TGCC | | | | | |
| POT5 | | | TGCC | TGAG | | | | |
| POT6 | | | TGCC | CACT | | | | |
| POT7 | | | | CACT | TGAG | | | |
| POT8 | | | | CACT | GTCG | | | |
| POT9 | | | | | GTCG | TGAG | | |
| POT10 | | | | | GTCG | GGAG | | |
| POT11 | | | | | | GGAG | TGAG | |
| POT12 | | | | | | GGAG | CGTA | |
| POT13 | | | | | | | CGTA | TGAG |
| POT14 | | | | | | | CGTA | GAAC |
| POT15 | | | | | | | | GAAC | TGAG |

Fig. 3B

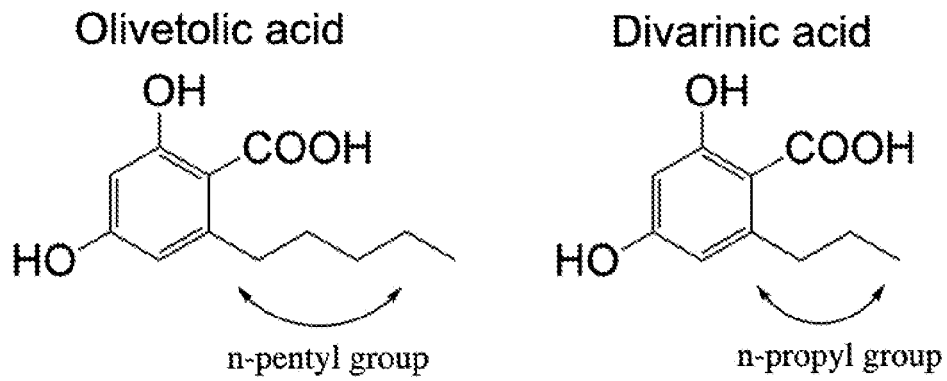

Fig. 8

| Starter used | Extender used | Product detected in S. cerevisiae | Proposed R-group on OLA side chain |
|---|---|---|---|
| C3 Propionic acid | Malonic acid | X | |
| C4 Butyric acid | Malonic acid | ✓ Divarinic acid | |
| C5 Valeric acid | Malonic acid | ✓ | |
| C6 Hexanoic acid | Malonic acid | ✓ Olivetolic acid | |
| C7 Heptanoic acid | Malonic acid | ✓ | |
| C8 Octanoic acid | Malonic acid | ✓ | |
| C9 Nonanoic acid | Malonic acid | X | |
| C10 Decanoic acid | Malonic acid | X | |

Different OLA analogues observed in chassis host

Fig. 9

| Pathway construct expressed in *E. coli* | Substrates | Novel olivetolic acid analogues identified |
|---|---|---|
| 4MOO, BMOO, CMOO, PMOO | propanoic acid (C3) and malonic acid | 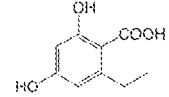<br>2,4-Dihydroxy-6-ethylbenzoic acid<br><br>Isotopic Mw: 182.05791<br>Theoretical (M-H) Mw: 181.05063 |
| PMOO | butanoic acid (C4) and malonic acid | 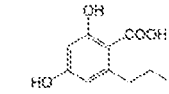<br>2,4-Dihydroxy-6-propylbenzoic acid Divarinic acid<br>Isotopic DA Mw: 196.07356<br>Theoretical DA (M-H) Mw: 195.06628 |
| 4MOO, BMOO, CMOO, PMOO | pentanoic acid (C5) and malonic acid | 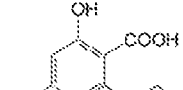<br>2,4-Dihydroxy-6-butylbenzoic acid<br>Isotopic Mw: 210.08921<br>Theoretical (M-H) Mw: 209.08359 |
| 4MOO, BMOO, CMOO, PMOO | heptanoic acid (C7) and malonic acid | 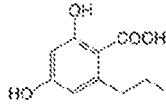<br>2,4-Dihydroxy-6-hexylbenzoic acid<br>Isotopic Mw: 238.1205<br>Theoretical (M-H) Mw: 237.1132 |

Fig. 10

| Pathway construct expressed in E. coli | Substrates | Novel olivetolic acid analogues identified |
|---|---|---|
| 4MOO, BMOO, CMOO, PMOO | octanoic acid (C8) and malonic acid | 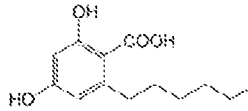 2,4-Dihydroxy-6-heptylbenzoic acid<br>Isotopic Mw: 252.1362<br>Theoretical (M-H) Mw: 251.1289 |
| 4MOO, BMOO, CMOO, PMOO | nonanoic acid (C9) and malonic acid | 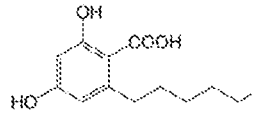 2,4-Dihydroxy-6-octylbenzoic acid<br>Isotopic Mw: 266.1518<br>Theoretical (M-H) Mw: 265.1445 |
| 4MOO, BMOO, CMOO, PMOO | decanoic acid (C10) and malonic acid | 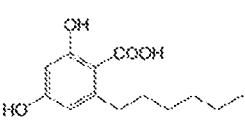 2,4-Dihydroxy-6-nonylbenzoic acid<br>Isotopic Mw: 280.1675<br>Theoretical (M-H) Mw: 279.1602 |

Fig. 10 (continued)

ID="1" />

SEQUENCE LISTING

<160> NUMBER OF SEQ ID NOS: 12

<210> SEQ ID NO 1
<211> LENGTH: 542
<212> TYPE: PRT
<213> ORGANISM: Nicotiana tabacum
<220> FEATURE:
<221> NAME/KEY: misc_feature
<223> OTHER INFORMATION: 4-coumarate-CoA ligase 2

<400> SEQUENCE: 1

```
Met Glu Lys Asp Thr Lys Gln Val Asp Ile Ile Phe Arg Ser Lys Leu
1               5                   10                  15

Pro Asp Ile Tyr Ile Pro Asn His Leu Pro Leu His Ser Tyr Cys Phe
            20                  25                  30

Glu Asn Ile Ser Glu Phe Ser Ser Arg Pro Cys Leu Ile Asn Gly Ala
        35                  40                  45

Asn Lys Gln Ile Tyr Thr Tyr Ala Asp Val Glu Leu Asn Ser Arg Lys
    50                  55                  60

Val Ala Ala Gly Leu His Lys Gln Gly Ile Gln Pro Lys Asp Thr Ile
65                  70                  75                  80

Met Ile Leu Leu Pro Asn Ser Pro Glu Phe Val Phe Ala Phe Ile Gly
                85                  90                  95

Ala Ser Tyr Leu Gly Ala Ile Ser Thr Met Ala Asn Pro Leu Phe Thr
            100                 105                 110

Pro Ala Glu Val Val Lys Gln Ala Lys Ala Ser Ser Ala Lys Ile Ile
        115                 120                 125

Val Thr Gln Ala Cys His Val Asn Lys Val Lys Asp Tyr Ala Phe Glu
    130                 135                 140

Asn Asp Val Lys Ile Ile Cys Ile Asp Ser Ala Pro Glu Gly Cys Leu
145                 150                 155                 160

His Phe Ser Val Leu Thr Gln Ala Asn Glu His Asp Ile Pro Glu Val
                165                 170                 175

Glu Ile Gln Pro Asp Asp Val Val Ala Leu Pro Tyr Ser Ser Gly Thr
            180                 185                 190

Thr Gly Leu Pro Lys Gly Val Met Leu Thr His Lys Gly Leu Val Thr
        195                 200                 205

Ser Val Ala Gln Gln Val Asp Gly Glu Asn Pro Asn Leu Tyr Ile His
    210                 215                 220

Ser Glu Asp Val Met Leu Cys Val Leu Pro Leu Phe His Ile Tyr Ser
225                 230                 235                 240

Leu Asn Ser Val Leu Leu Cys Gly Leu Arg Val Gly Ala Ala Ile Leu
                245                 250                 255

Ile Met Gln Lys Phe Asp Ile Val Ser Phe Leu Glu Leu Ile Gln Ser
            260                 265                 270

Tyr Lys Val Thr Ile Gly Pro Phe Val Pro Ile Val Leu Ala Ile
        275                 280                 285

Ala Lys Ser Pro Met Val Asp Asp Tyr Asp Leu Ser Ser Val Arg Thr
    290                 295                 300

Val Met Ser Gly Ala Ala Pro Leu Gly Lys Glu Leu Glu Asp Thr Val
305                 310                 315                 320

Arg Ala Lys Phe Pro Asn Ala Lys Leu Gly Gln Gly Tyr Gly Met Thr
                325                 330                 335

Glu Ala Gly Pro Val Leu Ala Met Cys Leu Ala Phe Ala Lys Glu Pro
            340                 345                 350
```

-continued

```
Phe Glu Ile Lys Ser Gly Ala Cys Gly Thr Val Val Arg Asn Ala Glu
            355                 360                 365

Met Lys Ile Val Asp Pro Lys Thr Gly Asn Ser Leu Pro Arg Asn Gln
    370                 375                 380

Ser Gly Glu Ile Cys Ile Arg Gly Asp Gln Ile Met Lys Gly Tyr Leu
385                 390                 395                 400

Asn Asp Pro Glu Ala Thr Ala Arg Thr Ile Asp Lys Glu Gly Trp Leu
                405                 410                 415

Tyr Thr Gly Asp Ile Gly Tyr Ile Asp Asp Asp Glu Leu Phe Ile
                420                 425                 430

Val Asp Arg Leu Lys Glu Leu Ile Lys Tyr Lys Gly Phe Gln Val Ala
            435                 440                 445

Pro Ala Glu Leu Glu Ala Leu Leu Leu Asn His Pro Asn Ile Ser Asp
        450                 455                 460

Ala Ala Val Val Pro Met Lys Asp Glu Gln Ala Gly Glu Val Pro Val
465                 470                 475                 480

Ala Phe Val Val Arg Ser Asn Gly Ser Thr Ile Thr Glu Asp Glu Val
                485                 490                 495

Lys Asp Phe Ile Ser Lys Gln Val Ile Phe Tyr Lys Arg Ile Lys Arg
            500                 505                 510

Val Phe Phe Val Asp Ala Ile Pro Lys Ser Pro Ser Gly Lys Ile Leu
        515                 520                 525

Arg Lys Asp Leu Arg Ala Lys Leu Ala Ala Gly Leu Pro Asn
    530                 535                 540
```

<210> SEQ ID NO 2
<211> LENGTH: 524
<212> TYPE: PRT
<213> ORGANISM: Rhodopseudomonas palustri
<220> FEATURE:
<221> NAME/KEY: misc_feature
<223> OTHER INFORMATION: benzoate-CoA ligase

<400> SEQUENCE: 2

```
Met Asn Ala Ala Ala Val Thr Pro Pro Glu Lys Phe Asn Phe Ala
1               5                   10                  15

Glu His Leu Leu Gln Thr Asn Arg Val Arg Pro Asp Lys Thr Ala Phe
            20                  25                  30

Val Asp Asp Ile Ser Ser Leu Ser Phe Ala Gln Leu Glu Ala Gln Thr
        35                  40                  45

Arg Gln Leu Ala Ala Ala Leu Arg Ala Ile Gly Val Lys Arg Glu Glu
    50                  55                  60

Arg Val Leu Leu Leu Met Leu Asp Gly Thr Asp Trp Pro Val Ala Phe
65                  70                  75                  80

Leu Gly Ala Ile Tyr Ala Gly Ile Val Pro Val Ala Val Asn Thr Leu
                85                  90                  95

Leu Thr Ala Asp Asp Tyr Ala Tyr Met Leu Glu His Ser Arg Ala Gln
            100                 105                 110

Ala Val Leu Val Ser Gly Ala Leu His Pro Val Leu Lys Ala Ala Leu
        115                 120                 125

Thr Lys Ser Asp His Glu Val Gln Arg Val Ile Val Ser Arg Pro Ala
    130                 135                 140

Ala Pro Leu Glu Pro Gly Glu Val Asp Phe Ala Glu Phe Val Gly Ala
145                 150                 155                 160

His Ala Pro Leu Glu Lys Pro Ala Ala Thr Gln Ala Asp Asp Pro Ala
                165                 170                 175
```

Phe Trp Leu Tyr Ser Ser Gly Ser Thr Gly Arg Pro Lys Gly Val Val
                180                 185                 190

His Thr His Ala Asn Pro Tyr Trp Thr Ser Glu Leu Tyr Gly Arg Asn
            195                 200                 205

Thr Leu His Leu Arg Glu Asp Asp Val Cys Phe Ser Ala Ala Lys Leu
210                 215                 220

Phe Phe Ala Tyr Gly Leu Gly Asn Ala Leu Thr Phe Pro Met Thr Val
225                 230                 235                 240

Gly Ala Thr Thr Leu Leu Met Gly Glu Arg Pro Thr Pro Asp Ala Val
                245                 250                 255

Phe Lys Arg Trp Leu Gly Gly Val Gly Val Lys Pro Thr Val Phe
            260                 265                 270

Tyr Gly Ala Pro Thr Gly Tyr Ala Gly Met Leu Ala Ala Pro Asn Leu
                275                 280                 285

Pro Ser Arg Asp Gln Val Ala Leu Arg Leu Ala Ser Ala Gly Glu
290                 295                 300

Ala Leu Pro Ala Glu Ile Gly Gln Arg Phe Gln Arg His Phe Gly Leu
305                 310                 315                 320

Asp Ile Val Asp Gly Ile Gly Ser Thr Glu Met Leu His Ile Phe Leu
                325                 330                 335

Ser Asn Leu Pro Asp Arg Val Arg Tyr Gly Thr Thr Gly Trp Pro Val
            340                 345                 350

Pro Gly Tyr Gln Ile Glu Leu Arg Gly Asp Gly Gly Pro Val Ala
            355                 360                 365

Asp Gly Glu Pro Gly Asp Leu Tyr Ile His Gly Pro Ser Ser Ala Thr
370                 375                 380

Met Tyr Trp Gly Asn Arg Ala Lys Ser Arg Asp Thr Phe Gln Gly Gly
385                 390                 395                 400

Trp Thr Lys Ser Gly Asp Lys Tyr Val Arg Asn Asp Asp Gly Ser Tyr
            405                 410                 415

Thr Tyr Ala Gly Arg Thr Asp Asp Met Leu Lys Val Ser Gly Ile Tyr
            420                 425                 430

Val Ser Pro Phe Glu Ile Glu Ala Thr Leu Val Gln His Pro Gly Val
            435                 440                 445

Leu Glu Ala Ala Val Val Gly Val Ala Asp Glu His Gly Leu Thr Lys
            450                 455                 460

Pro Lys Ala Tyr Val Val Pro Arg Pro Gly Gln Thr Leu Ser Glu Thr
465                 470                 475                 480

Glu Leu Lys Thr Phe Ile Lys Asp Arg Leu Ala Pro Tyr Lys Tyr Pro
                485                 490                 495

Arg Ser Thr Val Phe Val Ala Glu Leu Pro Lys Thr Ala Thr Gly Lys
            500                 505                 510

Ile Gln Arg Phe Lys Leu Arg Glu Gly Val Leu Gly
            515                 520

<210> SEQ ID NO 3
<211> LENGTH: 448
<212> TYPE: PRT
<213> ORGANISM: Streptomyces coelicolor
<220> FEATURE:
<221> NAME/KEY: misc_feature
<223> OTHER INFORMATION: phenylacetate-CoA ligase

<400> SEQUENCE: 3

Met Ser Ser Glu Pro Thr Thr Gly Thr Ala Pro Ala Pro Arg Arg Gly

```
  1               5                    10                   15
Glu Pro Leu Pro His Asp Leu Leu Asp Asp Ala Glu Arg Leu Ser Arg
            20                  25                  30

Glu Gln Leu Arg Glu Leu Gln Leu Asp Arg Leu Arg Ala Thr Leu Arg
            35                  40                  45

His Ala Tyr Asp Asn Val Glu Leu Tyr Arg Lys Lys Phe Asp Ala Ala
            50                  55                  60

Gly Val Thr Pro Asp Asp Cys Arg Ser Leu Ala Asp Leu Ser Arg Phe
65                      70                  75                  80

Pro Phe Thr Thr Lys Ala Asp Leu Arg Asp Thr Tyr Pro Phe Gly Met
                85                  90                  95

Phe Ala Val Pro Met Ala Asp Val Arg Arg Val His Ala Ser Ser Gly
                100                 105                 110

Thr Thr Gly Arg Ala Thr Val Val Gly Tyr Thr Glu Asn Asp Leu Ser
            115                 120                 125

Met Trp Ala Asp Val Val Ala Arg Ser Ile Arg Ala Ala Gly Gly Arg
            130                 135                 140

Pro Gly His Lys Val His Ile Ser Tyr Gly Tyr Gly Leu Phe Thr Gly
145                 150                 155                 160

Gly Leu Gly Ala His Tyr Gly Ala Glu Arg Ala Gly Cys Thr Val Ile
                165                 170                 175

Pro Ala Ser Gly Gly Met Thr Ala Arg Gln Val Gln Ile Ile Gln Asp
                180                 185                 190

Phe Arg Pro Glu Ile Ile Met Val Thr Pro Ser Tyr Met Leu Thr Leu
            195                 200                 205

Leu Asp Glu Phe Glu Arg Gln Gly Val Asp Pro Arg Thr Ser Ser Leu
210                 215                 220

Gln Val Gly Ile Phe Gly Ala Glu Pro Trp Thr Glu Met Arg Arg
225                 230                 235                 240

Glu Ile Glu Glu Arg Met Asp Ile His Ala Val Asp Ile Tyr Gly Leu
            245                 250                 255

Ser Glu Val Ile Gly Pro Gly Val Ala Gln Glu Cys Val Glu Thr Lys
            260                 265                 270

Asp Gly Leu His Ile Trp Glu Asp His Phe Tyr Pro Glu Val Val Asp
            275                 280                 285

Pro Leu Thr Asp Ala Val Leu Pro Gly Glu Glu Gly Glu Ile Val
            290                 295                 300

Phe Thr Ser Leu Thr Lys Glu Ala Leu Pro Val Ile Arg Tyr Arg Thr
305                 310                 315                 320

Arg Asp Leu Thr Arg Leu Leu Pro Gly Thr Ala Arg Pro Ala Phe Arg
                325                 330                 335

Arg Met Arg Lys Val Thr Gly Arg Cys Asp Asp Met Ile Ile Leu Arg
                340                 345                 350

Gly Val Asn Val Phe Pro Thr Gln Val Glu Glu Ile Val Leu Arg Thr
                355                 360                 365

Pro Gly Val Ala Pro His Phe Gln Met Arg Leu Thr Glu Arg Gly Arg
            370                 375                 380

Met Asp His Met Thr Val Arg Val Glu Ala Arg Pro Asp Ala Ala Pro
385                 390                 395                 400

Glu Gln Arg Asp Ala Ala Ala Arg Ala Ile Ala Gln Gly Val Lys Asp
                405                 410                 415

Gly Val Gly Val Thr Val Glu Val Glu Val Val Glu Pro Glu Thr Leu
            420                 425                 430
```

```
Glu Arg Ser Leu Gly Lys Ile Arg Arg Val Trp Asp Gln Arg Gly Ala
            435                 440                 445
```

<210> SEQ ID NO 4
<211> LENGTH: 543
<212> TYPE: PRT
<213> ORGANISM: Cannabis sativa
<220> FEATURE:
<221> NAME/KEY: misc_feature
<223> OTHER INFORMATION: acyl-activating enzyme 3

<400> SEQUENCE: 4

```
Met Glu Lys Ser Gly Tyr Gly Arg Asp Gly Ile Tyr Arg Ser Leu Arg
1               5                   10                  15

Pro Pro Leu His Leu Pro Asn Asn Asn Leu Ser Met Val Ser Phe
            20                  25                  30

Leu Phe Arg Asn Ser Ser Tyr Pro Gln Lys Pro Ala Leu Ile Asp
            35                  40                  45

Ser Glu Thr Asn Gln Ile Leu Ser Phe Ser His Phe Lys Ser Thr Val
        50                  55                  60

Ile Lys Val Ser His Gly Phe Leu Asn Leu Gly Ile Lys Lys Asn Asp
65                  70                  75                  80

Val Val Leu Ile Tyr Ala Pro Asn Ser Ile His Phe Pro Val Cys Phe
                85                  90                  95

Leu Gly Ile Ile Ala Ser Gly Ala Ile Ala Thr Thr Ser Asn Pro Leu
            100                 105                 110

Tyr Thr Val Ser Glu Leu Ser Lys Gln Val Lys Asp Ser Asn Pro Lys
            115                 120                 125

Leu Ile Ile Thr Val Pro Gln Leu Leu Glu Lys Val Lys Gly Phe Asn
        130                 135                 140

Leu Pro Thr Ile Leu Ile Gly Pro Asp Ser Glu Gln Glu Ser Ser Ser
145                 150                 155                 160

Asp Lys Val Met Thr Phe Asn Asp Leu Val Asn Leu Gly Gly Ser Ser
                165                 170                 175

Gly Ser Glu Phe Pro Ile Val Asp Asp Phe Lys Gln Ser Asp Thr Ala
            180                 185                 190

Ala Leu Leu Tyr Ser Ser Gly Thr Thr Gly Met Ser Lys Gly Val Val
            195                 200                 205

Leu Thr His Lys Asn Phe Ile Ala Ser Ser Leu Met Val Thr Met Glu
        210                 215                 220

Gln Asp Leu Val Gly Glu Met Asp Asn Val Phe Leu Cys Phe Leu Pro
225                 230                 235                 240

Met Phe His Val Phe Gly Leu Ala Ile Ile Thr Tyr Ala Gln Leu Gln
                245                 250                 255

Arg Gly Asn Thr Val Ile Ser Met Ala Arg Phe Asp Leu Glu Lys Met
            260                 265                 270

Leu Lys Asp Val Glu Lys Tyr Lys Val Thr His Leu Trp Val Val Pro
            275                 280                 285

Pro Val Ile Leu Ala Leu Ser Lys Asn Ser Met Val Lys Lys Phe Asn
        290                 295                 300

Leu Ser Ser Ile Lys Tyr Ile Gly Ser Gly Ala Ala Pro Leu Gly Lys
305                 310                 315                 320

Asp Leu Met Glu Glu Cys Ser Lys Val Val Pro Tyr Gly Ile Val Ala
                325                 330                 335

Gln Gly Tyr Gly Met Thr Glu Thr Cys Gly Ile Val Ser Met Glu Asp
```

```
                    340                 345                 350
Ile Arg Gly Gly Lys Arg Asn Ser Gly Ser Ala Gly Met Leu Ala Ser
            355                 360                 365

Gly Val Glu Ala Gln Ile Val Ser Val Asp Thr Leu Lys Pro Leu Pro
    370                 375                 380

Pro Asn Gln Leu Gly Glu Ile Trp Val Lys Gly Pro Asn Met Met Gln
385                 390                 395                 400

Gly Tyr Phe Asn Asn Pro Gln Ala Thr Lys Leu Thr Ile Asp Lys Lys
                405                 410                 415

Gly Trp Val His Thr Gly Asp Leu Gly Tyr Phe Asp Glu Asp Gly His
            420                 425                 430

Leu Tyr Val Val Asp Arg Ile Lys Glu Leu Ile Lys Tyr Lys Gly Phe
        435                 440                 445

Gln Val Ala Pro Ala Glu Leu Glu Gly Leu Leu Val Ser His Pro Glu
    450                 455                 460

Ile Leu Asp Ala Val Val Ile Pro Phe Pro Asp Ala Glu Ala Gly Glu
465                 470                 475                 480

Val Pro Val Ala Tyr Val Val Arg Ser Pro Asn Ser Ser Leu Thr Glu
                485                 490                 495

Asn Asp Val Lys Lys Phe Ile Ala Gly Gln Val Ala Ser Phe Lys Arg
            500                 505                 510

Leu Arg Lys Val Thr Phe Ile Asn Ser Val Pro Lys Ser Ala Ser Gly
        515                 520                 525

Lys Ile Leu Arg Arg Glu Leu Ile Gln Lys Val Arg Ser Asn Met
    530                 535                 540

<210> SEQ ID NO 5
<211> LENGTH: 504
<212> TYPE: PRT
<213> ORGANISM: Rhizobium trifolii
<220> FEATURE:
<221> NAME/KEY: misc_feature
<223> OTHER INFORMATION: malonyl-CoA synthetase

<400> SEQUENCE: 5

Met Ser Asn His Leu Phe Asp Ala Met Arg Ala Ala Pro Gly Asn
1               5                   10                  15

Ala Pro Phe Ile Arg Ile Asp Asn Thr Arg Thr Trp Thr Tyr Asp Asp
            20                  25                  30

Ala Phe Ala Leu Ser Gly Arg Ile Ala Ser Ala Met Asp Ala Leu Gly
        35                  40                  45

Ile Arg Pro Gly Asp Arg Val Ala Val Gln Val Glu Lys Ser Ala Glu
    50                  55                  60

Ala Leu Ile Leu Tyr Leu Ala Cys Leu Arg Ser Gly Ala Val Tyr Leu
65                  70                  75                  80

Pro Leu Asn Thr Ala Tyr Thr Leu Ala Glu Leu Asp Tyr Phe Ile Gly
                85                  90                  95

Asp Ala Glu Pro Arg Leu Val Val Ala Ser Ser Ala Arg Ala Gly
            100                 105                 110

Val Glu Thr Ile Ala Lys Pro Arg Gly Ala Ile Val Glu Thr Leu Asp
        115                 120                 125

Ala Ala Gly Ser Gly Ser Leu Leu Asp Leu Ala Arg Asp Glu Pro Ala
    130                 135                 140

Asp Phe Val Asp Ala Ser Arg Ser Ala Asp Asp Leu Ala Ala Ile Leu
145                 150                 155                 160
```

-continued

Tyr Thr Ser Gly Thr Thr Gly Arg Ser Lys Gly Ala Met Leu Thr His
                165                 170                 175

Gly Asn Leu Leu Ser Asn Ala Leu Thr Leu Arg Asp Phe Trp Arg Val
            180                 185                 190

Thr Ala Gly Asp Arg Leu Ile His Ala Leu Pro Ile Phe His Thr His
        195                 200                 205

Gly Leu Phe Val Ala Thr Asn Val Thr Leu Leu Ala Gly Ala Ser Met
    210                 215                 220

Phe Leu Leu Ser Lys Phe Asp Pro Glu Glu Ile Leu Ser Leu Met Pro
225                 230                 235                 240

Gln Ala Thr Met Leu Met Gly Val Pro Thr Phe Tyr Val Arg Leu Leu
                245                 250                 255

Gln Ser Pro Arg Leu Asp Lys Gln Ala Val Ala Asn Ile Arg Leu Phe
            260                 265                 270

Ile Ser Gly Ser Ala Pro Leu Leu Ala Glu Thr His Thr Glu Phe Gln
        275                 280                 285

Ala Arg Thr Gly His Ala Ile Leu Glu Arg Tyr Gly Met Thr Glu Thr
    290                 295                 300

Asn Met Asn Thr Ser Asn Pro Tyr Glu Gly Lys Arg Ile Ala Gly Thr
305                 310                 315                 320

Val Gly Phe Pro Leu Pro Asp Val Thr Val Arg Val Thr Asp Pro Ala
                325                 330                 335

Thr Gly Leu Ala Leu Pro Pro Glu Gln Thr Gly Met Ile Glu Ile Lys
            340                 345                 350

Gly Pro Asn Val Phe Lys Gly Tyr Trp Arg Met Pro Glu Lys Thr Ala
        355                 360                 365

Ala Glu Phe Thr Ala Asp Gly Phe Phe Ile Ser Gly Asp Leu Gly Lys
    370                 375                 380

Ile Asp Arg Asp Gly Tyr Val His Ile Val Gly Arg Gly Lys Asp Leu
385                 390                 395                 400

Val Ile Ser Gly Gly Tyr Asn Ile Tyr Pro Lys Glu Val Glu Gly Glu
                405                 410                 415

Ile Asp Gln Ile Glu Gly Val Val Glu Ser Ala Val Ile Gly Val Pro
            420                 425                 430

His Pro Asp Phe Gly Glu Gly Val Thr Ala Val Val Arg Lys Pro
        435                 440                 445

Gly Ala Ala Leu Asp Glu Lys Ala Ile Val Ser Ala Leu Gln Asp Arg
    450                 455                 460

Leu Ala Arg Tyr Lys Gln Pro Lys Arg Ile Ile Phe Ala Glu Asp Leu
465                 470                 475                 480

Pro Arg Asn Thr Met Gly Lys Val Gln Lys Asn Ile Leu Arg Gln Gln
                485                 490                 495

Tyr Ala Asp Leu Tyr Thr Arg Thr
            500

<210> SEQ ID NO 6
<211> LENGTH: 385
<212> TYPE: PRT
<213> ORGANISM: Cannabis sativa
<220> FEATURE:
<221> NAME/KEY: misc_feature
<223> OTHER INFORMATION: olivetol synthase

<400> SEQUENCE: 6

Met Asn His Leu Arg Ala Glu Gly Pro Ala Ser Val Leu Ala Ile Gly
1               5                   10                  15

```
Thr Ala Asn Pro Glu Asn Ile Leu Leu Gln Asp Glu Phe Pro Asp Tyr
             20                  25                  30

Tyr Phe Arg Val Thr Lys Ser Glu His Met Thr Gln Leu Lys Glu Lys
         35                  40                  45

Phe Arg Lys Ile Cys Asp Lys Ser Met Ile Arg Lys Arg Asn Cys Phe
     50                  55                  60

Leu Asn Glu Glu His Leu Lys Gln Asn Pro Arg Leu Val Glu His Glu
65                  70                  75                  80

Met Gln Thr Leu Asp Ala Arg Gln Asp Met Leu Val Val Glu Val Pro
                 85                  90                  95

Lys Leu Gly Lys Asp Ala Cys Ala Lys Ala Ile Lys Glu Trp Gly Gln
             100                 105                 110

Pro Lys Ser Lys Ile Thr His Leu Ile Phe Thr Ser Ala Ser Thr Thr
         115                 120                 125

Asp Met Pro Gly Ala Asp Tyr His Cys Ala Lys Leu Leu Gly Leu Ser
    130                 135                 140

Pro Ser Val Lys Arg Val Met Met Tyr Gln Leu Gly Cys Tyr Gly Gly
145                 150                 155                 160

Gly Thr Val Leu Arg Ile Ala Lys Asp Ile Ala Glu Asn Asn Lys Gly
                165                 170                 175

Ala Arg Val Leu Ala Val Cys Cys Asp Ile Met Ala Cys Leu Phe Arg
            180                 185                 190

Gly Pro Ser Glu Ser Asp Leu Glu Leu Leu Val Gly Gln Ala Ile Phe
        195                 200                 205

Gly Asp Gly Ala Ala Ala Val Ile Val Gly Ala Glu Pro Asp Glu Ser
    210                 215                 220

Val Gly Glu Arg Pro Ile Phe Glu Leu Val Ser Thr Gly Gln Thr Ile
225                 230                 235                 240

Leu Pro Asn Ser Glu Gly Thr Ile Gly Gly His Ile Arg Glu Ala Gly
                245                 250                 255

Leu Ile Phe Asp Leu His Lys Asp Val Pro Met Leu Ile Ser Asn Asn
            260                 265                 270

Ile Glu Lys Cys Leu Ile Glu Ala Phe Thr Pro Ile Gly Ile Ser Asp
        275                 280                 285

Trp Asn Ser Ile Phe Trp Ile Thr His Pro Gly Gly Lys Ala Ile Leu
    290                 295                 300

Asp Lys Val Glu Glu Lys Leu His Leu Lys Ser Asp Lys Phe Val Asp
305                 310                 315                 320

Ser Arg His Val Leu Ser Glu His Gly Asn Met Ser Ser Ser Thr Val
                325                 330                 335

Leu Phe Val Met Asp Glu Leu Arg Lys Arg Ser Leu Glu Glu Gly Lys
            340                 345                 350

Ser Thr Thr Gly Asp Gly Phe Glu Trp Gly Val Leu Phe Gly Phe Gly
        355                 360                 365

Pro Gly Leu Thr Val Glu Arg Val Val Arg Ser Val Pro Ile Lys
    370                 375                 380

Tyr
385

<210> SEQ ID NO 7
<211> LENGTH: 101
<212> TYPE: PRT
<213> ORGANISM: Cannabis sativa
<220> FEATURE:
```

<220> NAME/KEY: misc_feature
<223> OTHER INFORMATION: olivetolic acid cyclase

<400> SEQUENCE: 7

Met Ala Val Lys His Leu Ile Val Leu Lys Phe Lys Asp Glu Ile Thr
1               5                   10                  15

Glu Ala Gln Lys Glu Glu Phe Phe Lys Thr Tyr Val Asn Leu Val Asn
            20                  25                  30

Ile Ile Pro Ala Met Lys Asp Val Tyr Trp Gly Lys Asp Val Thr Gln
        35                  40                  45

Lys Asn Lys Glu Glu Gly Tyr Thr His Ile Val Glu Val Thr Phe Glu
    50                  55                  60

Ser Val Glu Thr Ile Gln Asp Tyr Ile Ile His Pro Ala His Val Gly
65                  70                  75                  80

Phe Gly Asp Val Tyr Arg Ser Phe Trp Glu Lys Leu Leu Ile Phe Asp
                85                  90                  95

Tyr Thr Pro Arg Lys
            100

<210> SEQ ID NO 8
<211> LENGTH: 307
<212> TYPE: PRT
<213> ORGANISM: Artificial Sequence
<220> FEATURE:
<223> OTHER INFORMATION: Streptomyces sp. CL190 NphB V49W, Y288A

<400> SEQUENCE: 8

Met Ser Glu Ala Ala Asp Val Glu Arg Val Tyr Ala Ala Met Glu Glu
1               5                   10                  15

Ala Ala Gly Leu Leu Gly Val Ala Cys Ala Arg Asp Lys Ile Tyr Pro
            20                  25                  30

Leu Leu Ser Thr Phe Gln Asp Thr Leu Val Glu Gly Gly Ser Val Val
        35                  40                  45

Trp Phe Ser Met Ala Ser Gly Arg His Ser Thr Glu Leu Asp Phe Ser
    50                  55                  60

Ile Ser Val Pro Thr Ser His Gly Asp Pro Tyr Ala Thr Val Val Glu
65                  70                  75                  80

Lys Gly Leu Phe Pro Ala Thr Gly His Pro Val Asp Asp Leu Leu Ala
                85                  90                  95

Asp Thr Gln Lys His Leu Pro Val Ser Met Phe Ala Ile Asp Gly Glu
            100                 105                 110

Val Thr Gly Gly Phe Lys Lys Thr Tyr Ala Phe Phe Pro Thr Asp Asn
        115                 120                 125

Met Pro Gly Val Ala Glu Leu Ser Ala Ile Pro Ser Met Pro Pro Ala
    130                 135                 140

Val Ala Glu Asn Ala Glu Leu Phe Ala Arg Tyr Gly Leu Asp Lys Val
145                 150                 155                 160

Gln Met Thr Ser Met Asp Tyr Lys Lys Arg Gln Val Asn Leu Tyr Phe
                165                 170                 175

Ser Glu Leu Ser Ala Gln Thr Leu Glu Ala Glu Ser Val Leu Ala Leu
            180                 185                 190

Val Arg Glu Leu Gly Leu His Val Pro Asn Glu Leu Gly Leu Lys Phe
        195                 200                 205

Cys Lys Arg Ser Phe Ser Val Tyr Pro Thr Leu Asn Trp Glu Thr Gly
    210                 215                 220

Lys Ile Asp Arg Leu Cys Phe Ala Val Ile Ser Asn Asp Pro Thr Leu

```
               225                 230                 235                 240

Val Pro Ser Ser Asp Glu Gly Asp Ile Glu Lys Phe His Asn Tyr Ala
                245                 250                 255

Thr Lys Ala Pro Tyr Ala Tyr Val Gly Glu Lys Arg Thr Leu Val Tyr
                260                 265                 270

Gly Leu Thr Leu Ser Pro Lys Glu Glu Tyr Tyr Lys Leu Gly Ala Ala
                275                 280                 285

Tyr His Ile Thr Asp Val Gln Arg Gly Leu Leu Lys Ala Phe Asp Ser
                290                 295                 300

Leu Glu Asp
305

<210> SEQ ID NO 9
<211> LENGTH: 307
<212> TYPE: PRT
<213> ORGANISM: Artificial Sequence
<220> FEATURE:
<223> OTHER INFORMATION: Streptomyces sp. CL190 NphB V49W, Y288P

<400> SEQUENCE: 9

Met Ser Glu Ala Ala Asp Val Glu Arg Val Tyr Ala Ala Met Glu Glu
1               5                   10                  15

Ala Ala Gly Leu Leu Gly Val Ala Cys Ala Arg Asp Lys Ile Tyr Pro
                20                  25                  30

Leu Leu Ser Thr Phe Gln Asp Thr Leu Val Glu Gly Gly Ser Val Val
                35                  40                  45

Trp Phe Ser Met Ala Ser Gly Arg His Ser Thr Glu Leu Asp Phe Ser
        50                  55                  60

Ile Ser Val Pro Thr Ser His Gly Asp Pro Tyr Ala Thr Val Val Glu
65                  70                  75                  80

Lys Gly Leu Phe Pro Ala Thr Gly His Pro Val Asp Asp Leu Leu Ala
                85                  90                  95

Asp Thr Gln Lys His Leu Pro Val Ser Met Phe Ala Ile Asp Gly Glu
                100                 105                 110

Val Thr Gly Gly Phe Lys Lys Thr Tyr Ala Phe Phe Pro Thr Asp Asn
                115                 120                 125

Met Pro Gly Val Ala Glu Leu Ser Ala Ile Pro Ser Met Pro Pro Ala
        130                 135                 140

Val Ala Glu Asn Ala Glu Leu Phe Ala Arg Tyr Gly Leu Asp Lys Val
145                 150                 155                 160

Gln Met Thr Ser Met Asp Tyr Lys Lys Arg Gln Val Asn Leu Tyr Phe
                165                 170                 175

Ser Glu Leu Ser Ala Gln Thr Leu Glu Ala Glu Ser Val Leu Ala Leu
                180                 185                 190

Val Arg Glu Leu Gly Leu His Val Pro Asn Glu Leu Gly Leu Lys Phe
                195                 200                 205

Cys Lys Arg Ser Phe Ser Val Tyr Pro Thr Leu Asn Trp Glu Thr Gly
        210                 215                 220

Lys Ile Asp Arg Leu Cys Phe Ala Val Ile Ser Asn Asp Pro Thr Leu
225                 230                 235                 240

Val Pro Ser Ser Asp Glu Gly Asp Ile Glu Lys Phe His Asn Tyr Ala
                245                 250                 255

Thr Lys Ala Pro Tyr Ala Tyr Val Gly Glu Lys Arg Thr Leu Val Tyr
                260                 265                 270

Gly Leu Thr Leu Ser Pro Lys Glu Glu Tyr Tyr Lys Leu Gly Ala Pro
```

275                 280                 285

Tyr His Ile Thr Asp Val Gln Arg Gly Leu Leu Lys Ala Phe Asp Ser
    290                 295                 300

Leu Glu Asp
305

<210> SEQ ID NO 10
<211> LENGTH: 307
<212> TYPE: PRT
<213> ORGANISM: Artificial Sequence
<220> FEATURE:
<223> OTHER INFORMATION: Streptomyces sp. CL190 NphB V49W, Y288A, Q295F

<400> SEQUENCE: 10

Met Ser Glu Ala Ala Asp Val Glu Arg Val Tyr Ala Ala Met Glu Glu
1               5                   10                  15

Ala Ala Gly Leu Leu Gly Val Ala Cys Ala Arg Asp Lys Ile Tyr Pro
                20                  25                  30

Leu Leu Ser Thr Phe Gln Asp Thr Leu Val Glu Gly Gly Ser Val Val
            35                  40                  45

Trp Phe Ser Met Ala Ser Gly Arg His Ser Thr Glu Leu Asp Phe Ser
    50                  55                  60

Ile Ser Val Pro Thr Ser His Gly Asp Pro Tyr Ala Thr Val Val Glu
65                  70                  75                  80

Lys Gly Leu Phe Pro Ala Thr Gly His Pro Val Asp Asp Leu Leu Ala
                85                  90                  95

Asp Thr Gln Lys His Leu Pro Val Ser Met Phe Ala Ile Asp Gly Glu
            100                 105                 110

Val Thr Gly Gly Phe Lys Lys Thr Tyr Ala Phe Phe Pro Thr Asp Asn
        115                 120                 125

Met Pro Gly Val Ala Glu Leu Ser Ala Ile Pro Ser Met Pro Pro Ala
130                 135                 140

Val Ala Glu Asn Ala Glu Leu Phe Ala Arg Tyr Gly Leu Asp Lys Val
145                 150                 155                 160

Gln Met Thr Ser Met Asp Tyr Lys Lys Arg Gln Val Asn Leu Tyr Phe
                165                 170                 175

Ser Glu Leu Ser Ala Gln Thr Leu Glu Ala Glu Ser Val Leu Ala Leu
            180                 185                 190

Val Arg Glu Leu Gly Leu His Val Pro Asn Glu Leu Gly Leu Lys Phe
        195                 200                 205

Cys Lys Arg Ser Phe Ser Val Tyr Pro Thr Leu Asn Trp Glu Thr Gly
210                 215                 220

Lys Ile Asp Arg Leu Cys Phe Ala Val Ile Ser Asn Asp Pro Thr Leu
225                 230                 235                 240

Val Pro Ser Ser Asp Glu Gly Asp Ile Glu Lys Phe His Asn Tyr Ala
                245                 250                 255

Thr Lys Ala Pro Tyr Ala Tyr Val Gly Glu Lys Arg Thr Leu Val Tyr
            260                 265                 270

Gly Leu Thr Leu Ser Pro Lys Glu Glu Tyr Tyr Lys Leu Gly Ala Ala
        275                 280                 285

Tyr His Ile Thr Asp Val Phe Arg Gly Leu Leu Lys Ala Phe Asp Ser
    290                 295                 300

Leu Glu Asp
305

<210> SEQ ID NO 11
<211> LENGTH: 307
<212> TYPE: PRT
<213> ORGANISM: Artificial Sequence
<220> FEATURE:
<223> OTHER INFORMATION: Streptomyces sp. CL190  NphB V49W, Y288P, Q295F

<400> SEQUENCE: 11

```
Met Ser Glu Ala Ala Asp Val Glu Arg Val Tyr Ala Ala Met Glu Glu
1               5                   10                  15

Ala Ala Gly Leu Leu Gly Val Ala Cys Ala Arg Asp Lys Ile Tyr Pro
            20                  25                  30

Leu Leu Ser Thr Phe Gln Asp Thr Leu Val Glu Gly Gly Ser Val Val
        35                  40                  45

Trp Phe Ser Met Ala Ser Gly Arg His Ser Thr Glu Leu Asp Phe Ser
    50                  55                  60

Ile Ser Val Pro Thr Ser His Gly Asp Pro Tyr Ala Thr Val Val Glu
65                  70                  75                  80

Lys Gly Leu Phe Pro Ala Thr Gly His Pro Val Asp Asp Leu Leu Ala
                85                  90                  95

Asp Thr Gln Lys His Leu Pro Val Ser Met Phe Ala Ile Asp Gly Glu
            100                 105                 110

Val Thr Gly Gly Phe Lys Lys Thr Tyr Ala Phe Phe Pro Thr Asp Asn
        115                 120                 125

Met Pro Gly Val Ala Glu Leu Ser Ala Ile Pro Ser Met Pro Pro Ala
    130                 135                 140

Val Ala Glu Asn Ala Glu Leu Phe Ala Arg Tyr Gly Leu Asp Lys Val
145                 150                 155                 160

Gln Met Thr Ser Met Asp Tyr Lys Lys Arg Gln Val Asn Leu Tyr Phe
                165                 170                 175

Ser Glu Leu Ser Ala Gln Thr Leu Glu Ala Glu Ser Val Leu Ala Leu
            180                 185                 190

Val Arg Glu Leu Gly Leu His Val Pro Asn Glu Leu Gly Leu Lys Phe
        195                 200                 205

Cys Lys Arg Ser Phe Ser Val Tyr Pro Thr Leu Asn Trp Glu Thr Gly
    210                 215                 220

Lys Ile Asp Arg Leu Cys Phe Ala Val Ile Ser Asn Asp Pro Thr Leu
225                 230                 235                 240

Val Pro Ser Ser Asp Glu Gly Asp Ile Glu Lys Phe His Asn Tyr Ala
                245                 250                 255

Thr Lys Ala Pro Tyr Ala Tyr Val Gly Glu Lys Arg Thr Leu Val Tyr
            260                 265                 270

Gly Leu Thr Leu Ser Pro Lys Glu Glu Tyr Tyr Lys Leu Gly Ala Pro
        275                 280                 285

Tyr His Ile Thr Asp Val Phe Arg Gly Leu Leu Lys Ala Phe Asp Ser
    290                 295                 300

Leu Glu Asp
305
```

<210> SEQ ID NO 12
<211> LENGTH: 538
<212> TYPE: PRT
<213> ORGANISM: Artificial Sequence
<220> FEATURE:
<223> OTHER INFORMATION: VSP-CBDA fusion

<400> SEQUENCE: 12

```
Met Phe Ser Leu Lys Ala Leu Leu Pro Leu Ala Leu Leu Val Ser
1               5                   10                  15

Ala Asn Gln Val Ala Ala Asn Pro Arg Glu Asn Phe Leu Lys Cys Phe
            20                  25                  30

Ser Gln Tyr Ile Pro Asn Asn Ala Thr Asn Leu Lys Leu Val Tyr Thr
            35                  40                  45

Gln Asn Asn Pro Leu Tyr Met Ser Val Leu Asn Ser Thr Ile His Asn
50                  55                  60

Leu Arg Phe Thr Ser Asp Thr Thr Pro Lys Pro Leu Val Ile Val Thr
65                  70                  75                  80

Pro Ser His Val Ser His Ile Gln Gly Thr Ile Leu Cys Ser Lys Lys
                85                  90                  95

Val Gly Leu Gln Ile Arg Thr Arg Ser Gly Gly His Asp Ser Glu Gly
            100                 105                 110

Met Ser Tyr Ile Ser Gln Val Pro Phe Val Ile Val Asp Leu Arg Asn
            115                 120                 125

Met Arg Ser Ile Lys Ile Asp Val His Ser Gln Thr Ala Trp Val Glu
            130                 135                 140

Ala Gly Ala Thr Leu Gly Glu Val Tyr Tyr Trp Val Asn Glu Lys Asn
145                 150                 155                 160

Glu Asn Leu Ser Leu Ala Ala Gly Tyr Cys Pro Thr Val Cys Ala Gly
                165                 170                 175

Gly His Phe Gly Gly Gly Gly Tyr Gly Pro Leu Met Arg Asn Tyr Gly
            180                 185                 190

Leu Ala Ala Asp Asn Ile Ile Asp Ala His Leu Val Asn Val His Gly
            195                 200                 205

Lys Val Leu Asp Arg Lys Ser Met Gly Glu Asp Leu Phe Trp Ala Leu
            210                 215                 220

Arg Gly Gly Gly Ala Glu Ser Phe Gly Ile Ile Val Ala Trp Lys Ile
225                 230                 235                 240

Arg Leu Val Ala Val Pro Lys Ser Thr Met Phe Ser Val Lys Lys Ile
            245                 250                 255

Met Glu Ile His Glu Leu Val Lys Leu Val Asn Lys Trp Gln Asn Ile
            260                 265                 270

Ala Tyr Lys Tyr Asp Lys Asp Leu Leu Leu Met Thr His Phe Ile Thr
            275                 280                 285

Arg Asn Ile Thr Asp Asn Gln Gly Lys Asn Lys Thr Ala Ile His Thr
            290                 295                 300

Tyr Phe Ser Ser Val Phe Leu Gly Gly Val Asp Ser Leu Val Asp Leu
305                 310                 315                 320

Met Asn Lys Ser Phe Pro Glu Leu Gly Ile Lys Lys Thr Asp Cys Arg
            325                 330                 335

Gln Leu Ser Trp Ile Asp Thr Ile Ile Phe Tyr Ser Gly Val Val Asn
            340                 345                 350

Tyr Asp Thr Asp Asn Phe Asn Lys Glu Ile Leu Leu Asp Arg Ser Ala
            355                 360                 365

Gly Gln Asn Gly Ala Phe Lys Ile Lys Leu Asp Tyr Val Lys Lys Pro
            370                 375                 380

Ile Pro Glu Ser Val Phe Val Gln Ile Leu Glu Lys Leu Tyr Glu Glu
385                 390                 395                 400

Asp Ile Gly Ala Gly Met Tyr Ala Leu Tyr Pro Tyr Gly Gly Ile Met
                405                 410                 415

Asp Glu Ile Ser Glu Ser Ala Ile Pro Phe Pro His Arg Ala Gly Ile
```

-continued

```
                        420                 425                 430
Leu Tyr Glu Leu Trp Tyr Ile Cys Ser Trp Glu Lys Gln Glu Asp Asn
            435                 440                 445

Glu Lys His Leu Asn Trp Ile Arg Asn Ile Tyr Asn Phe Met Thr Pro
        450                 455                 460

Tyr Val Ser Lys Asn Pro Arg Leu Ala Tyr Leu Asn Tyr Arg Asp Leu
465                 470                 475                 480

Asp Ile Gly Ile Asn Asp Pro Lys Asn Pro Asn Asn Tyr Thr Gln Ala
                485                 490                 495

Arg Ile Trp Gly Glu Lys Tyr Phe Gly Lys Asn Phe Asp Arg Leu Val
            500                 505                 510

Lys Val Lys Thr Leu Val Asp Pro Asn Asn Phe Phe Arg Asn Glu Gln
        515                 520                 525

Ser Ile Pro Pro Leu Pro Arg His Arg His
        530                 535
```

RECOMBINANT *Saccharomyces cerevisiae* CELLS FOR CANNABINOID PRODUCTION

CROSS-REFERENCE TO RELATED APPLICATIONS

The present application is the National Phase of International Application No. PCT/SG2020/050584, filed on Oct. 12, 2020, which claims the benefit of U.S. Provisional Patent Application No. 62/914,058, filed on Oct. 11, 2019. The content of both applications is hereby incorporated by reference in its entirety.

BACKGROUND

Research and therapeutic use of phytocannabinoids, which are compounds originally isolated from the plant *Cannabis. sativa*, has been largely hindered due to legal and social issues. Some cannabinoids such as $\Delta^9$-tetrahydrocannabinol (THC), produced as a mixture with other cannabinoids in the plant, are found to be psychoactive. However, there are at least 113 known cannabinoids isolated from *C. sativa* (Aizpurua-Olaizola et al., J. Nat. Prod., 2016, 79(2): 324-331), most of which are non-psychoactive and have distinct pharmacological properties.

The widespread expression of human cannabinoid receptors implies that these chemical compounds have an extensive effect on the human body. There are two main classes of receptors—$CB_1$ receptors are expressed mainly in the central nervous system, while $CB_2$ receptors are found predominantly in the peripheral immune system. In addition, studies have also uncovered expression of these receptors in various human tissues such as the heart, adrenal gland, lung, spleen, and tonsils (Galiègue et al., Eur. J. Biochem., 1995, 232(1):54-61). The association of cannabinoids with these receptors actuates signaling pathways that can potentially affect a wide range of biological systems in the human body.

Phytocannabinoids have been approved for use clinically by the US Food and Drug Administration as anti-emetic agents for patients undergoing intensive chemotherapy cancer treatment (THC and Dronabinol; Pertwee, Forsch. Komplementarmed., 1999, Suppl 3:12-15) and in the United Kingdom as a highly effective treatment for spasticity in patients with multiple sclerosis who are non-responsive to other medications (Flachenecker et al, Eur. Neurol., 2014, 71(5-6):271-279). Various studies have also shown the therapeutic potential of phytocannabinoids as anti-tumor agents (Velasco et al., Nat. Rev. Cancer, 2012, 12(6):436-444; Maria Pyszniak et al., Onco. Targets Therapy, 2016, 9:4323-4336) and anti-bacterial agents that may be effective against several strains of methicillin-resistant *Staphylococcus aureus* (MRSA) (Appendino et al., J. Nat. Prod., 2008, 71(8):1427-1430).

In light of these recent developments in cannabinoid research, the legal cannabis market is currently estimated to be worth USD7.7 billion internationally and this is expected to grow to around USD31.4 billion by 2021 (Zhang, Forbes, 2017).

Currently, most of the cannabinoids for research or therapeutic use are produced from *C. sativa* extracts. Legal and social implications associated with the illicit use of the plant extracts poses the greatest challenge faced by traditional cultivation due to the high concentrations of psychoactive components such as THC, produced as a mixture in *C. sativa*. There is limited control in the selectivity of cannabinoids that are produced in the cultivation of *C. sativa*. Furthermore, there is a huge gap in the market for *C. sativa* strains producing minor cannabinoids such as cannabidivarin (CBDV) and cannabicyclol (CBL) for research into their therapeutic potential.

The cultivation of these plants is not only expensive due to the need for highly energy-intensive processes to control environmental factors, it is also environmentally unsustainable. Research conducted in 2012 by the Energy & Resources group in the Lawrence Berkeley National Laboratory estimated that the cost of energy consumption from the indoor practice of cannabis cultivation in the US alone was around USD 6 billion annually. Further, greenhouse gas emissions from this practice to produce a kilogram of the final product is equivalent to that of 3 million cars (Mills, Energy Policy, 2012, 46:58-67).

There exists a need to find alternative means of cannabinoid production that circumvents the complications described above.

SUMMARY

To meet the need set out, supra, a recombinant cell of *Saccharomyces cerevisiae* is provided that contains in its genome a plurality of nucleic acids each encoding a cannabinoid biosynthetic pathway gene such that a cannabinoid is produced by the recombinant cell in the presence of a cannabinoid precursor substrate. At least one of the cannabinoid biosynthetic pathway genes is not from *Cannabis sativa*.

Also disclosed is a method for producing a cannabinoid by contacting the recombinant cell with a cannabinoid precursor substrate and culturing the recombinant cell.

The details of one or more embodiments are set forth in the description and the examples below. Other features, objects, and advantages will be apparent from the detailed description, from the drawings, and also from the appended claims.

BRIEF DESCRIPTION OF THE DRAWINGS

The invention description below refers to the accompanying drawings, of which:

FIG. 3B shows sequences of level 1 transcriptional units (POT) prefix and suffix for assembly to level 2 pathway.

FIG. 8 shows the difference in carbon chain length between OLA and DVA (Groom et al., Acta Crystallogr. B Struct. Sci. Cryst. Eng. Mater, 2016, 72(Pt 2):171-179).

FIG. 9 shows production of OLA analogues using different starter units and *Saccharomyces cerevisiae* constructs.

FIG. 10 shows in column 3 the structures of novel olivetolic acid analogues produced in *E. coli* identified by extracted ion count LC-MS analysis. The *E. coli* expressed the biosynthetic pathways shown in column 1 and were incubated with the substrates shown in column 2. 4MOO=4-coumaryl-CoA ligase, malonyl-CoA synthethase (MCS), olivetol synthase (OLS), and olivetolic acid cyclase (OAC); BMOO=benzoate-CoA ligase, MCS, OLS, and OAC; CMOO=cinnamyl-CoA ligase, MCS, OLS, and OAC; and PMOO=phenylacetate-CoA ligase, MCS, OLS, and OAC.

DETAILED DESCRIPTION

Figure 1:
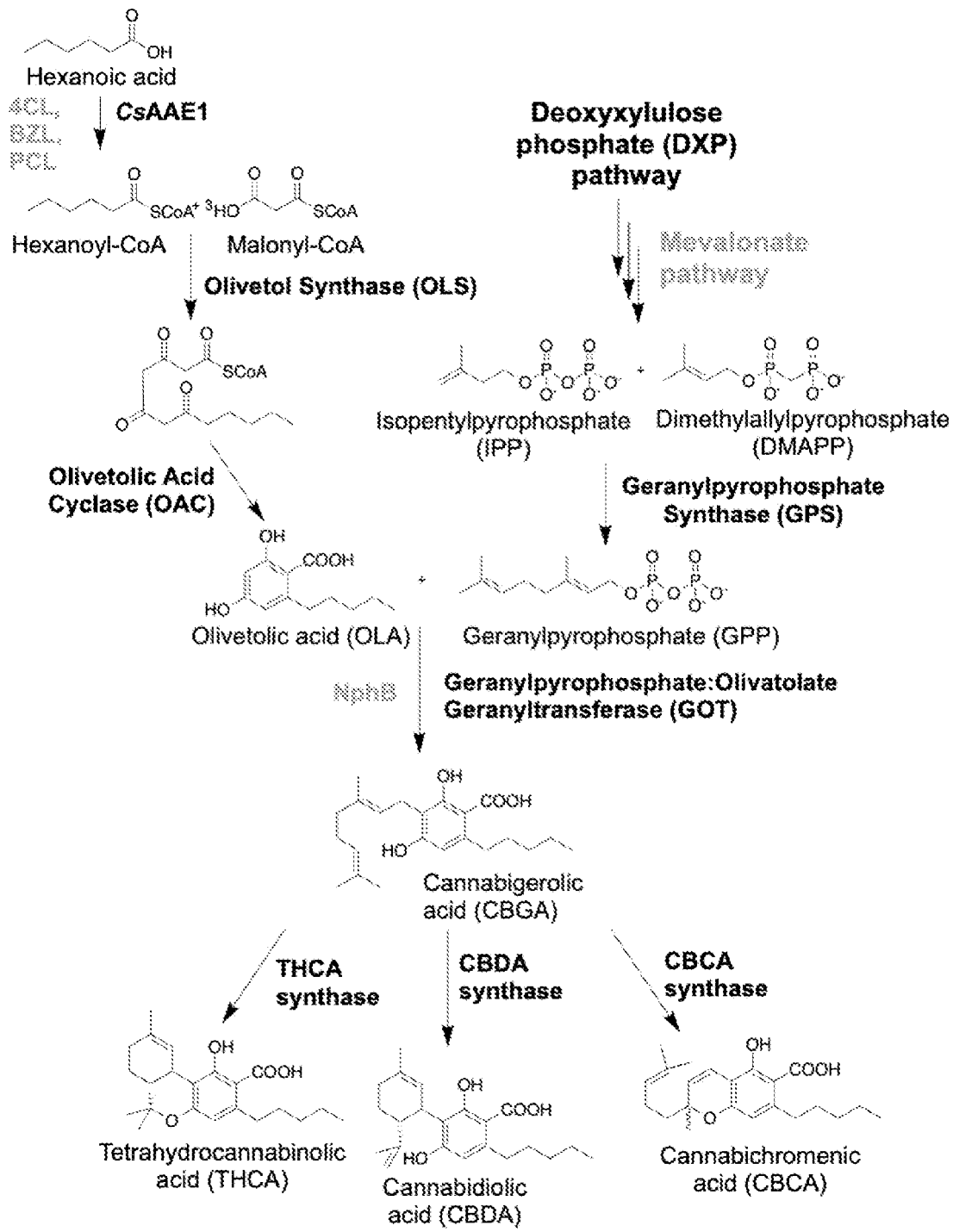
FIG. 1 shows the biosynthetic pathway of cannabinoids. The polyketide pathway is colored in black and the isoprenoid pathway is colored in light gray. Modifications made to the pathway are colored in dark gray.

As summarized above, the recombinant cell provided contains in its genome a plurality of nucleic acids each encoding a cannabinoid biosynthetic pathway gene. In an exemplary recombinant cell, the cannabinoid biosynthetic pathway genes are from organisms other than *Cannabis sativa*.

Certain recombinant cells encompassed by the invention contain a nucleic acid that encodes a coenzyme A (CoA) ligase. The CoA ligase can be, but is not limited to, *Nicotiana tabacum* 4-coumaryl-CoA ligase (SEQ ID NO: 1), *Rhodopseudomonas palstri* benzoate-CoA ligase (SEQ ID NO: 2), and *Streptomyces coelicolor* phenylacetate-CoA ligase (SEQ ID NO: 3). The CoA ligase can have 70% or greater identity (e.g., 70%, 75%, 80%, 85%, 90%, 95%, and 99% or greater) to the above-mentioned sequences while retaining enzymatic activity.

Further, the recombinant cell can include nucleic acids encoding each of an a malonyl-CoA synthethase (MCS), an olivetol synthase (OLS), and an olivetolic acid cyclase (OAC). In particular recombinant cells, the MCS is replaced by an acyl-activating enzyme (AAE).

The MCS can have the amino acid sequence of SEQ ID NO: 5, the OLS can have the amino acid sequence of SEQ ID NO: 6, the OAC can have the amino acid sequence of SEQ ID NO: 7, and the AAE can have the amino acid sequence of SEQ ID NO: 4.

Alternatively, the MCS, OLS, OAC, and AAE can have an amino acid sequence having 70% or more identity to the amino acid sequence of their corresponding SEQ ID NOs.

The recombinant cell set forth above will produce a cannabinoid in the presence of a cannabinoid precursor substrate. The cannabinoid precursor substrate can be, e.g., butyric acid, valeric acid, hexanoic acid, heptanoic acid, and octanoic acid. Additional cannabinoid precursor substrates are shown in Table 1 below.

TABLE 1

Cannabinoid precursor substrates

| Substrate Category | Examples |
| --- | --- |
| cinnamic acids | cinnamic acid, 2-fluorocinnamic acid, 3-fluorocinnamic acid, 4-fluorocinnamic acid, α-fluorocinnamic acid, 2-chloro-cinnamic acid, 3-chlorocinnamic acid, 4-chlorocinnamic acid, 4-methylcinnamic acid, α-methylcinnamic acid, 2-hydroxy-cinnamic acid, 4-hydroxycinnamic acid, 2-methoxycinnamic acid, 4-methoxy-cinnamic acid, 2,4-dimethoxycinnamic acid, 3,4-dimethoxycinnamic acid, 3-chloro-4-methoxycinnamic acid, 4-hydroxy-3-methoxycinnamic acid, 4-hydroxy-3,5-dimethoxycinnamic acid, 4-nitrocinnamic acid |
| phenylpropanoic acids | 3-phenylpropanoic acid, 2-hydroxy-3-phenylpropanoic acid, 3-(2-bromophenyl) propanoic acid, 3-(2-methoxyphenyl) propanoic acid, 3-(3-methoxyphenyl) propanoic acid, 3-(4-methoxyphenyl) propanoic acid, 3-(3-chlorophenyl) propanoic acid, 3-(4-fluorophenyl) propanoic acid, 3-(3,4-dihydroxyphenyl) propanoic acid, 3-(3,5-dichlorophenyl) propanoic acid, 3-(3,5-difluorophenyl) propanoic acid, 2-hydroxy-3-(4-fluoro-phenyl)propanoic acid, 3-(3-chloro-4-methoxyphenyl)propanoic acid |
| benzoic acids | benzoic acid, 2-fluorobenzoic acid, 3-fluorobenzoic acid, 4-fluorobenzoic acid, 2-chlorobenzoic acid, 3-chlorobenzoic acid, 4-chlorobenzoic acid, 2-bromo-benzoic acid, 3-bromobenzoic acid, 4-bromobenzoic acid, 2-iodobenzoic acid, 3-iodobenzoic acid, 4-iodobenzoic acid, 2-aminobenzoic acid, 3-aminobenzoic acid, 4-aminobenzoic acid, 2-acetoxy benzoic acid, 2-hydroxy-3,5-diiodo benzoic acid, 2-hydroxybenzoic acid, 2-methoxybenzoic acid, 2-methylbenzoic acid, 2,3-dihydroxybenzoic acid, 2,4-dihydroxybenzoic acid, 2,5-dihydroxy benzoic acid, 2,6-difluorobenzoic acid, 2,6-dimethylbenzoic acid, 3,4-dimethoxy benzoic acid, 3,5-dihydroxybenzoic acid, 3,4,5-trihydroxybenzoic acid, 3,5-dihydroxy-4-methoxybenzoic acid, 3,5-dimethylbenzoic acid, 4-amino-2-hydroxybenzoic acid |
| phenylacetic acids | phenylacetic acid, 2-hydroxyphenylacetic acid, 4-hydroxyphenylacetic acid, 4-methoxyphenylacetic acid, phenoxyacetic acid, 4-fluorophenoxyacetic acid, 2,4-dichlorophenoxyacetic acid, phenyl pyruvic acid |
| naphthalene, quinoline, and pyridine carboxylic acids | 1-naphthalenecarboxylic acid, 2-naphthalenecarboxylic acid, 2-quinoline carboxylic acid, 3-quinolinecarboxylic acid, 4-quinolinecarboxylic acid, isoquinoline-1-carboxylic acid, 2-quinoxalinecarboxylic acid, pyridine-2- |

TABLE 1-continued

Cannabinoid precursor substrates

| Substrate Category | Examples |
|---|---|
| | carboxylic acid, pyridine-3-carboxylic acid, pyridine-4-carboxylic acid, 2-chloropyridine-3-carboxylic acid, pyrazinecarboxylic acid |
| saturated aliphatic acids | acetic acid, propanoic acid, butanoic acid, pentanoic acid, hexanoic acid, heptanoic acid, octanoic acid, nonanoic acid, decanoic acid, pyruvic acid, acetoacetic acid, succinic acid, pimelic acid |
| unsaturated aliphatic acids | 2-propenoic acid, 2-methyl-2-propenoic acid, 2-butenoic acid, 3-butenoic acid, 2-methyl-2-butenoic acid, 3-methyl-2-butenoic acid, 2-pentenoic acid, 3-pentenoic acid, 4-pentenoic acid, 2-hexenoic acid, 3-hexenoic acid, 5-hexenoic acid, 3-methyl-4-pentenoic acid, shikimic acid |
| malonic acids | malonic acid, hydroxymalonic acid, methylmalonic acid, ethylmalonic acid, isopropylmalonic acid, n-butylmalonic acid, cyclopentylmalonic acid, allylmalonic acid, phenylmalonic acid, 3-thiophenemalonic acid, benzylmalonic acid |

As set forth in the SUMMARY section, a method for producing a cannabinoid is disclosed that uses the recombinant cell described above. The method is carried out by contacting the recombinant cell with a cannabinoid precursor substrate and culturing the recombinant cell.

In an exemplary method, the recombinant cell expresses a CoA ligase, a malonyl-CoA synthethase, an olivetol synthase, and an olivetolic acid cyclase, and the cannabinoid precursor substrate is butyric acid, valeric acid, hexanoic acid, heptanoic acid, or octanoic acid. Additional cannabinoid precursor substrates shown above in Table 1 can also be used in this method.

The cannabinoid biosynthetic pathway reconstituted synthetically in micro-organisms such as *Saccharomyces cerevisiae* is used for bio-production of major and minor cannabinoids. This method of bio-production facilitates the production of specific cannabinoids of interest, as compared to the mixture of cannabinoids produced by cultivation of *C. sativa*. Further, minor cannabinoids can be produced with high yield. In addition, enzymes in the cannabinoid biosynthetic pathway can be manipulated and expressed in micro-organisms to produce novel and unique cannabinoids that have therapeutic potential.

Without further elaboration, it is believed that one skilled in the art can, based on the disclosure herein, utilize the present disclosure to its fullest extent. The following specific examples are, therefore, to be construed as merely descriptive, and not limitative of the remainder of the disclosure in any way whatsoever. All publications cited herein are incorporated by reference in their entirety.

EXAMPLES

Example 1: Modifications to Cannabinoid Biosynthetic Pathway

To reconstruct the cannabinoid biosynthetic pathway in micro-organisms, it is necessary to first understand the enzymes present in *C. sativa* that catalyze each step in the pathway. See FIG. 1.

The upstream biosynthetic pathway can be categorized into two functional parts, the polyketide pathway, producing olivetolic acid (OLA) as the final product and the isoprenoid pathway producing geranyl pyrophosphate (GPP).

Polyketide OLA Production

The polyketide pathway (see FIG. 1, colored red) begins with the substrate hexanoic acid and malonyl-CoA. An acyl-activating enzyme named CsAAE1 (SEQ ID NO: 4) is responsible for the addition of the coenzyme-A moiety to hexanoic acid in the trichomes of *C. sativa* (Stout et al., Plant J., 2012, 71(3):353-365). A type III polyketide synthase named olivetol synthase (OLS; SEQ ID NO: 6) then catalyzes the formation of a tetraketide thioester (3, 5, 7-trioxododecanoyl-CoA) by utilizing one unit of hexanoyl-CoA and three units of malonyl-CoA (Taura et al., FEBS Lett, 2009, 583(12):2061-2066). Finally, olivetolic acid cyclase (OAC; SEQ ID NO: 7) catalyzes the C2-C7 aldol condensation cyclization step to produce OLA (Gagne et al., Proc. Natl. Acad. Sci. USA, 2012, 109(31):12811-12816).

Isoprenoid GPP Production

In *C. sativa*, isoprenoids such as dimethylallyl-pyrophosphate (DMAPP) and isopentenyl-pyrophosphate (IPP) are produced through the 2-C-methyl-D-erythritol 4-phosphate (MEP) pathway (see FIG. 1, colored blue) (Van Bakel et al., Genome Biol., 2011, 12(10):R102). A putative geranyl pyrophosphate synthase then combines one unit of DMAPP with one unit of IPP to produce geranyl pyrophosphate (GPP). Isoprenoids can also be produced in nature through the mevalonate pathway more commonly present in micro-organisms such as yeast and some bacteria (Buhaescu et al., Clin. Biochem., 2007, 40(9-10):575-584).

End-Point Cannabinoids

Once OLA and GPP are produced, the aromatic prenyltransferase enzyme geranylpyrophosphate:olivetolate geranyltransferase (GOT) then catalyzes the production of the first cannabinoid, cannabigerolic acid (CBGA), by transferring the C10 prenyl group in GPP onto $C_3$ of olivetolic acid (Fellermeier et al., FEBS Lett., 1998, 427(2):283-285; see FIG. 1). The biosynthesis of different cannabinoids such as tetrahydrocannabinolic acid (THCA) and cannabidiolic acid (CBDA) can then be carried out by their respective synthases (i.e., THCA synthase and CBDA synthase) by differentially cyclizing the C10 carbon chain on CBGA (see FIG. 1, colored black) previously transferred from GPP.

Modifications to Cannabinoid Biosynthetic Pathway

Modifications made to the cannabinoid biosynthetic pathway are illustrated in green in FIG. 1. A molecular toolkit was previously established to produce acyl-CoA thioesters with various functional groups using four different acyl-CoA ligases (Go et al., Biochemistry, 2012, 51(22):4568-4579). 4-coumaryl-CoA ligase (4CL) isolated from the plant *Nicotiana tabacum* (SEQ ID NO: 1), benzoate-CoA ligase (BZL) from the gram-negative bacteria *Rhodopseudomonas palstri* (SEQ ID NO: 2), and phenylacetate-CoA ligase (PCL) from the gram-positive bacteria *Streptomyces coelicolor* (SEQ ID NO: 3) were each determined to be substrate-promiscuous towards a diverse range of 70 carboxylic acids (see Table 1 above), including the native substrate of OLS, hexanoic acid. Further, malonyl-CoA synthetase (MCS) from the soil bacterium *Rhizobium trifolii* primes a number of malonic acids with a CoA moiety to serve as extender units for type III polyketide synthases such as OLS. Utilizing these well-characterized and substrate-promiscuous CoA-ligases in the pathway instead of CsAAE1 from *C. sativa* facilitates downstream production of diverse cannabinoids.

Each CoA-ligase is paired with malonyl-CoA synthethase (MCS), which is responsible for adding the CoA-moiety onto malonic acid.

Figure 2:
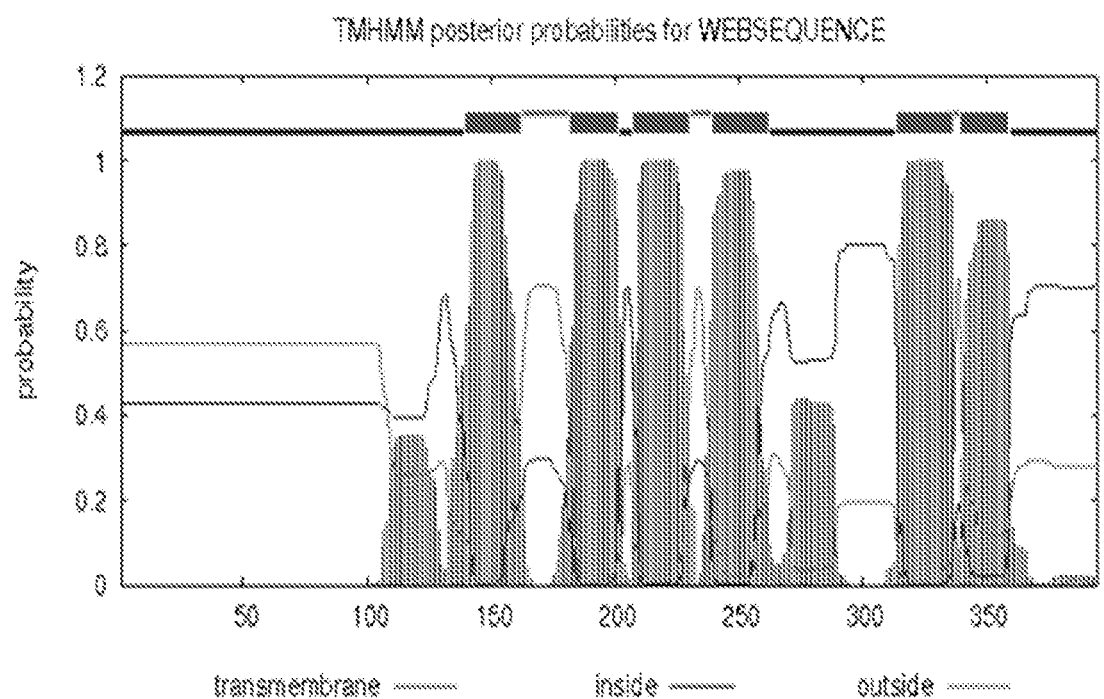
FIG. 2 shows results from the Transmembrane helices prediction webserver (TMHMM) for geranylpyrophosphate: olivetolate geranyltransferase showing 6 predicted transmembrane regions in its amino acid sequence.

It is challenging to express the prenyltransferase from *C. sativa*, i.e., GOT, in a heterologous system. Indeed, this enzyme is predicted to be a membrane-associated protein with intrinsic trans-membrane regions, as shown by the bioinformatics prediction tool, TMHMM (Carvalho et al., FEMS Yeast Res., 2017, 17(4)). See FIG. 2.

A soluble prenyltransferase from *Streptomyces* sp., namely, NphB, was previously shown to be able to accept OLA as its prenyl-acceptor in bacterial systems such as *E. coli* (Kuzuyama et al., Nature, 2005, 435(7044):983-987; Yang et al., Biochemistry, 2012, 51(12):2606-2618). This enzyme was used as an alternative to GOT for heterologous expression of prenyl-transferases in the cannabinoid biosynthetic pathway.

Example 2: Construct Assembly in *Saccharomyces cerevisiae*

The molecular cloning strategy for construct building in *S. cerevisiae* is a Golden-Gate assembly based suite of plasmids known as the YeastFab system (Guo et al.). The assembly system allows for the modular assembly of transcriptional units such as promoters and terminators to open reading frames (ORF), followed by the assembly of expression cassettes of up to six different transcriptional units.

Figure 3A:
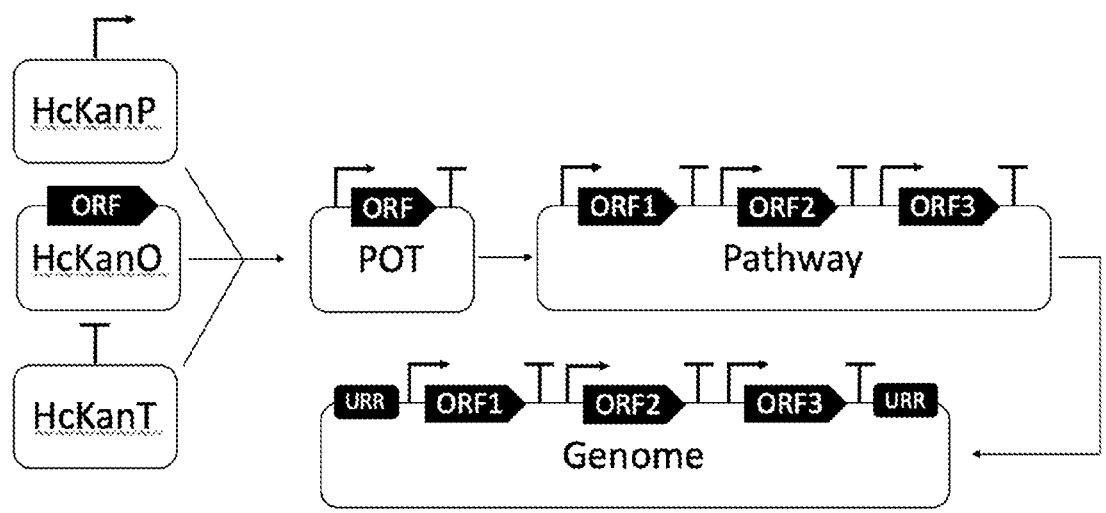
FIG. 3A is a schematic representation of the YeastFab pathway assembly system showing the cloning procedures from assembly from biological parts (Level 0) of pathways (Level 2). Image taken from Guo et al., Nucleic Acids Res., 2015., 43(13):e88.

The suite of YeastFab plasmids has been expanded to allow for the assembly of up to eight transcriptional units together. The modular nature of assembly advantageously facilitates downstream optimization due to the relative ease in changing out transcriptional regulatory units such as promoters and terminators to regulate the expression of each gene differentially in the biosynthetic pathway. In this method of pathway assembly, Type IIS restriction enzymes (e.g., BsaI and BsmBI) cuts adjacent to the enzyme recognition site, allowing both restriction enzymes and DNA ligase to work in a one-pot digestion-ligation reaction. See FIG. 3A.

Standard biological parts such as promoters, open reading frames and terminators are individually cloned into individual plasmids (Level 0). After the first round of one-pot digestion-ligation reaction, they are assembled into individual transcriptional units called POTs (Level 1). Each POT is designed to then assemble with another POT in the following reaction to assemble up to eight transcription units together into a pathway (Level 2) through prefix and suffix sequences that aligns together as depicted in FIG. 3B.

A library of yeast constitutive promoters was previously characterized according to their relative strengths. A set of promoters and terminators with various strength were chosen to express each enzyme in the biosynthetic pathway, reflecting their relative stoichiometries and toxicities to the expression host. Different promoters and terminators were assigned for each ORF (see Table 2 below) to prevent homologous recombination that occurs frequently in yeast between homologous sequences that are close to each other (Orr-Weaver et al., Proc. Natl. Acad. Sci. USA, 1981, 78(10):6354-6358).

TABLE 2

Promoters and terminators chosen for each ORF. (A) Pathway assembly to reach OLA. (B) Pathway assembly to reach CBGA. (C) Pathway assembly to reach end-point cannabinoid.

| POT | ORF | Promoter (Strength) | Terminator |
|---|---|---|---|
| A: Construct to OLA | | | |
| 2 | CoA Lig | RPL3p (Strong) | APL2t |
| 4 | MCS | PGK1p (Strong) | ATG10t |
| 6 | OLS | TDH3p (Strong) | LSC2t |
| 7 | OAC | TEF2p (Strong) | BUD32t |
| B: Construct to CBGA | | | |
| 2 | CoA Lig | RPL3p (Strong) | APL2t |
| 4 | MCS | PGK1p (Strong) | ATG10t |
| 6 | OLS | TDH3p (Strong) | LSC2t |
| 8 | OAC | TEF2p (Strong) | BUD32t |
| 10 | Erg20pWW/ AgGPPase/ ChiGPPase | ENO2p (Strong) | EFM1t |
| 11 | GOT/NphB | YEF3p (Medium)/ TPI1p (Strong) | CBR1t/EBS1t |
| C: Construct to end-point cannabinoid | | | |
| 2 | CoA Lig | RPL3p (Strong) | APL2t |
| 4 | MCS | PGK1p (Strong) | ATG10t |
| 6 | OLS | TDH3p (Strong) | LSC2t |
| 8 | OAC | TEF2p (Strong) | BUD32t |
| 10 | Erg20pWW/ AgGPPase/ ChiGPPase | ENO2p (Strong) | EFM1t |
| 12 | GOT/NphB | YEF3p (Medium)/ TPI1p (Strong) | CBR1t/EBS1t |
| 13 | THCAS/CBDAs/ CBCAs | SSA1p (Medium) | ENT2t |

After assembly of the transcriptional units with the assigned promoters and terminators, they were assembled into a pathway with multiple genes in a single plasmid. In yeast, farnesyl pyrophosphate (FPP), which is a C15 version of GPP by adding an additional IPP to GPP, is endogenously produced by the enzyme Erg20p. Previous studies have shown that expressing a double mutant of the enzyme, i.e., Erg20pWW (F96W-N127W), increases endogenous GPP levels (Ignea et al., ACS Synth. Biol., 2014, 3(5):298-306). This double mutant, together with the geranyl diphosphate synthase (Ag-GPPase) from *Abies grandis* (Burke et al., Arch. Biochem. Biophys., 2002, 405(1):130-136) and a chimeric GPP synthase (Chi-GPPase), were used to produce GPP in the construct to feed the reaction forward.

Example 3: Cannabinoid Bioproduction

After assembly of expression genes into their intended plasmids, they were then transformed into a single organism (*S. cerevisiae*) for bioproduction of the intended product. The yeast strain BY4741, which is auxotrophic for the amino acids methionine, leucine, histidine and uracil (Brachmann et al., Yeast, 1998, 14(2):115-132), was used for bio-production of cannabinoids. A step-wise approach can be taken as precautionary measure to ensure that yeast transformed with each plasmid subsequently expresses a functional enzyme. The product of each step (e.g., OLA, CBGA, and CBDA) was then detected using liquid chromatography-mass spectrometry (LC-MS) before moving on to the next step in the biosynthesis pathway.

*S. cerevisiae* cultures were grown to stationary phase to express the enzymes. Substrates, i.e., hexanoic acid and malonic acid, were added to the cultures, which were then incubated overnight at 25° C. Cultures were spun down to separate the pellets from the supernatant media. Both the cell pellets and supernatant media were checked for the presence of the intended product by LC-MS.

To prepare samples for LC-MS analysis, the supernatant media was acidified to pH<2.0 before extracting it three times with ethyl acetate. The extracted ethyl acetate was dried using a rotary vacuum concentrator, resuspended in methanol, and analysed by LC-MS. The cell pellets were also checked for presence of the intended product by firstly lysing the cells via glass-bead physical shearing or by chemical lysis. Consequently, the lysate underwent similar steps of acidification, organic extraction and LC-MS analysis.

Example 4: Biosynthesis of Novel Cannabinoids

Diversification of the cannabinoid library can be carried out to produce novel and unnatural cannabinoids by three different approaches, informed by computational analysis.

First, the traditional approach of precursor-directed combinatorial biosynthesis involving the utilization of different substrates fed to the constructs will facilitate the exploration of substrate-promiscuity profiles of the enzymes in the pathway. Unique and novel products formed at each step then serve as new substrates for the next step in the pathway, hence increasing the diversity of products produced. Each enzyme has an innate specificity to its substrates that it can accept due to steric constraints and interactions in its binding pocket. Computational approaches such as in silico docking allows the screening of large libraries of small-molecule compounds in a high-throughput manner to identify substrates with a favorable binding affinity that is then tested experimentally.

Second, in silico docking of a substrate to the enzyme structure will clearly elucidate the spatial constraints and the interactions of the substrate in the microenvironment of the active site. This information is then used to direct protein engineering. It is vital to understand the key interactions of the substrate to the binding pocket of the enzyme in order to rationally design specific mutations that may increase the diversity of substrates that each enzyme may accept.

Finally, there is a limit to the degree of protein engineering that can be applied to each enzyme as mutations thus introduced may unintentionally change the architecture of the entire protein structure and result in protein instability and inactivity. Orthologues from different organisms of the enzymes carrying out each biosynthetic step can be identified and incorporated into the pathway. The Enzyme Similarity tool from the Enzyme-Function Initiative (EFI-EST) is a bioinformatics web server that aids in the identification of orthologues of a protein query sequence (Gerlt et al., Biochim. Biophys. Acta, 2015, 1854(8):1019-1037). The web tool uses the UniProt database to identify amino acid sequences in nature that are related to the query sequence in terms of function and reactions catalyzed. It facilitates the visualization of their relationships by generating a sequence similarity network that identifies proteins from diverse families which may have very different substrate-specificity profiles. The orthologues thus identified, having an entirely different set of substrates that it can act on, can serve as suitable replacements for particular steps in the cannabinoid biosynthesis pathway and consequently produce unique and novel cannabinoid products.

Example 5: Cannabinoid Bio-Production in *S. cerevisiae*

Figure 4:
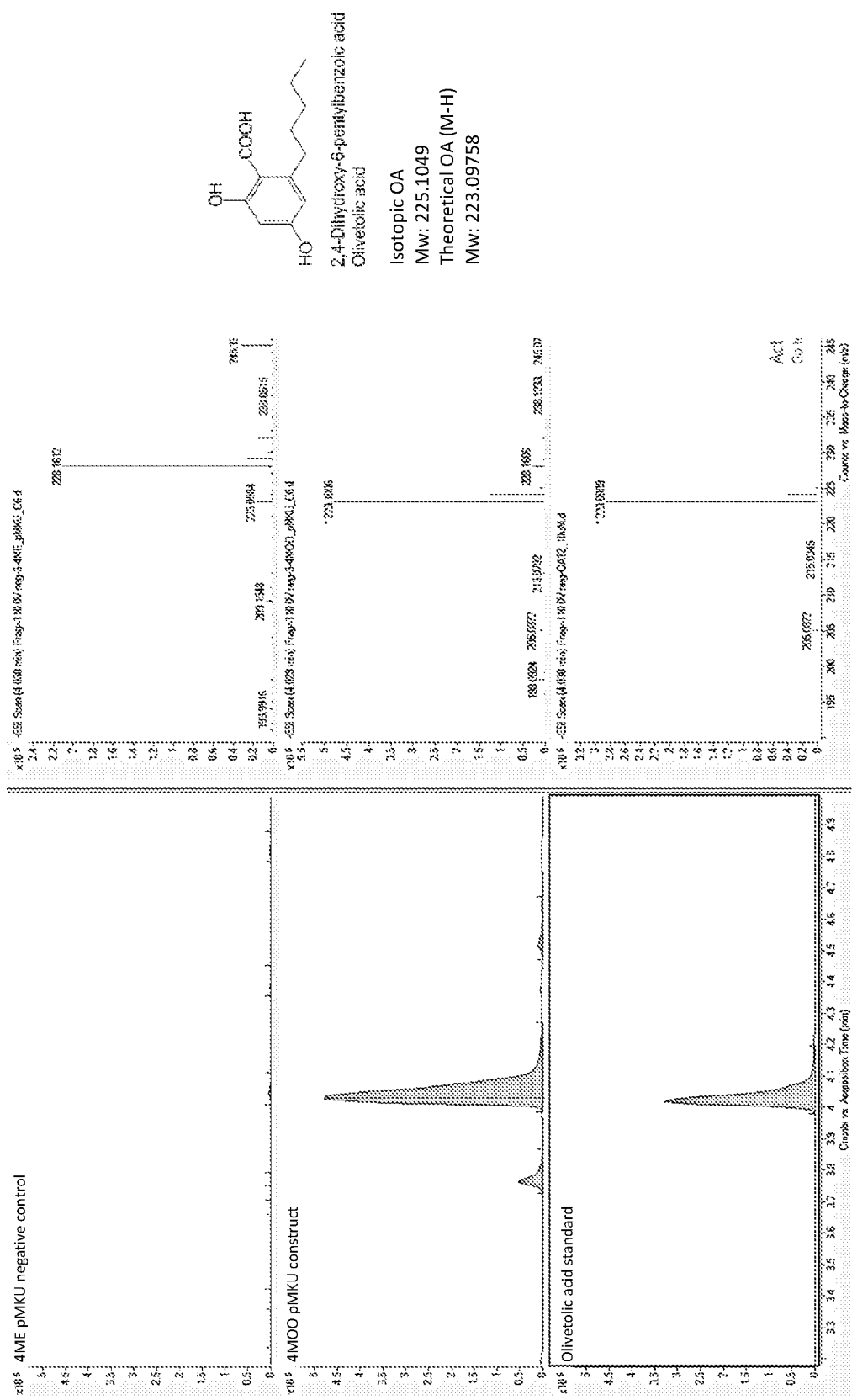
FIG. 4 shows extracted ion count (left side) and mass spectrum (right side) of the LC-MS analysis of cannabinoids produced in *S. cerevisiae*: (first row) negative control construct 4ME expressing 4CL and MCS; (second row) construct 4MOO, expressing 4CL, MCS, OLS and OAC; and (last row) OLA standard.

Transcriptional units were assembled into POTs as described above in Example 2. The plasmids were inserted into the level 2 assembly plasmids, pCKU and pMKU, which contain, respectively, the yeast low or high copy origins of replication CEN and 2µ, as well as a URA3 selection marker. The assembled plasmids were transformed into individual strains of *S. cerevisiae* BY4741 using a previously described lithium acetate method (Gietz et al., Nat. Protoc., 2007, 2(1):35-37). These strains were grown overnight before substrates hexanoic acid and malonic acid were added to the cultures. After an overnight incubation at 25° C. with the substrates, cultures were harvested and growth media from each culture was extracted with ethyl acetate. The results are shown in FIG. 4.

Culture supernatants of yeast expressing four enzymes in the cannabinoid pathway, i.e., CoA ligase, MCS, OLS, and OAC, demonstrated a peak eluting at ~4 min. having a m/z value of 223.100 (ppm error of 11.7), corresponding to that of an OLA. See FIG. 4, top and bottom rows. This peak was not seen in negative control supernatants from yeast lacking the polyketide synthase and polyketide cyclase, OLS and OAC See FIG. 4, top row.

The next step in the pathway produces CBGA. To do so, the first four genes mentioned above that produce OLA were assembled together with a GPP synthase enzyme (Erg20pWW, AgGPPase, or ChiGPPase) and a prenyltransferase, i.e., GOT or NphB, into the level 2 assembly plasmid pCKU and pMKU. After assembly of the transcriptional units and transformation into the host yeast strains, culture supernatants were analyzed by LC-MS as described above. A CBGA product was not observed in all of the constructs assembled, intracellularly or extracellularly. Not to be bound by theory, it is possible that the lack of CBGA in some cultures resulted from poor enzyme expression of the prenyltransferases (GOT or NphB) or a lack of substrate (OLA or GPP) available for the reaction.

Figure 5:
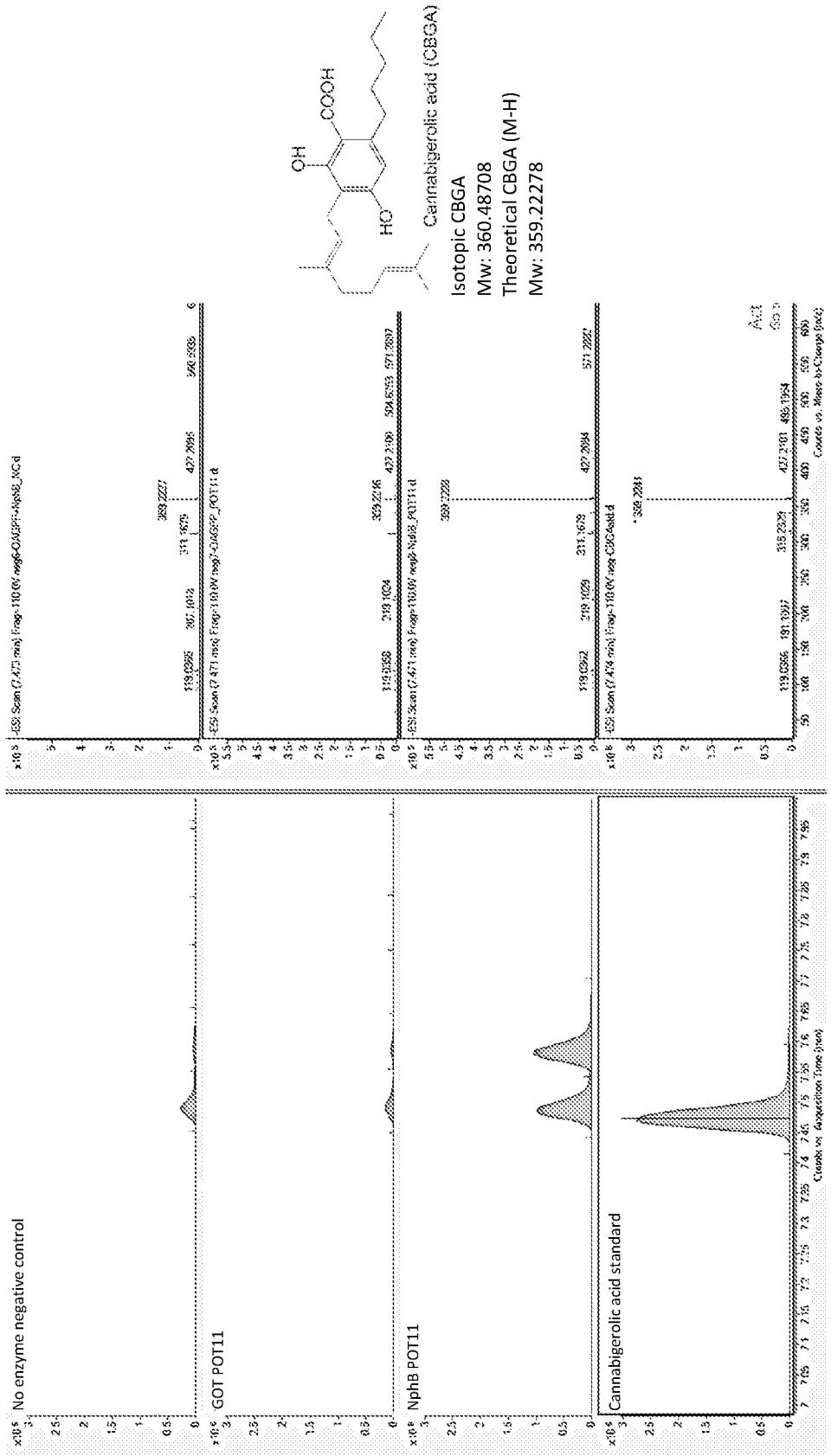
FIG. 5 shows extracted ion count and mass spectrum of the LC-MS analysis of in vitro enzymatic assays: no enzyme negative control with GPP and OLA (first row), enzyme GOT with GPP and OLA (second row), enzyme NphB with GPP and OLA (third row), and CBGA standard (last row).

To test the activity of the prenyltransferase enzyme, level 1 POT plasmids expressing the transcriptional units of GOT and NphB prenyltransferase were separately transformed into BY4741 cells. The cultures were grown and lysed at stationary phase as described above. An aliquot of the lysate was then added separately into an in vitro enzymatic assay set up with substrates OLA and GPP. A negative control was also set up by replacing the lysate with water. After incubation at 30° C., acidification and organic extraction was done before LC-MS detection. The results are shown in FIG. 5.

A small peak corresponding to CBGA was observed in the negative control (without enzymes added) and the lysate containing GOT. See FIG. 5, first and second rows. This data suggests that the prenylation of the geranyl moiety onto OLA happens as a spontaneous process without any enzymatic catalysis and small amounts will be observed when OLA and GPP are present in a mixture. GOT expressed in *S. cerevisiae* BY4741 was determined to be inactive as the peak area corresponding to CBGA was similar to that of the negative control.

NphB-containing lysate, on the other hand, showed a peak area for CBGA larger than to that of the negative control, indicating that the NphB was active. See FIG. 5, third row. A secondary peak eluted 0.1 min. later was also observed in the sample catalysed by NphB with the same m/z value as CBGA. This peak was previously reported to be an unspecific product of OLA prenylated at a different site from CBGA, namely, 2-O-geranyl olivetolic acid (Zirpel et al., J. Biotechnol., 2017, 259:204-212). As NphB was shown to function when expressed in yeast strain BY4741, the poor production of CBGA must lie with the supply of substrates OLA and GPP in the constructs. Not to be bound by theory, it is possible that insufficient yields of GPP was the most likely cause of the low CBGA yield, as peaks corresponding to OLA were detected in all the constructs.

Methods for overexpressing monoterpenes derived from GPP in *S. cerevisiae* are well known in the art. There are an abundance of papers published describing work done in achieving improved monoterpene production in yeast due to their high commercial value. One approach to improve GPP yield is to reduce the metabolic burdens borne by the yeast host. It has been reported that, by overexpressing four genes involved in the mevalonate pathway and the respective monoterpene synthase, geraniol synthase, a seven-fold increase in geraniol yield was achieved, compared to previously engineered yeast strains (Zhao et al.).

Figure 6:
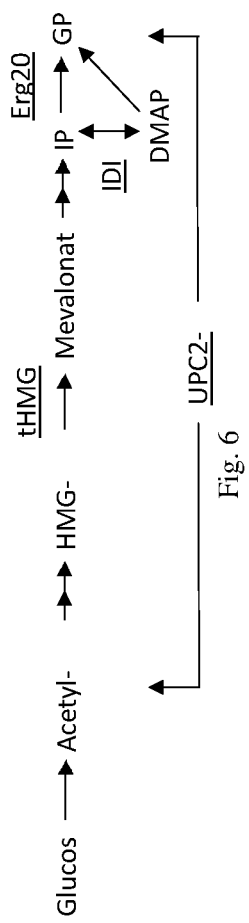
FIG. 6 shows a simplified mevalonate pathway overexpressing monoterpene precursors IPP, DMAPP and GPP together with geraniol biosynthesis in *S. cerevisiae* (Zhao et al., Appl. Microbiol. Biotechnol., 2016, 100(10):4561-4571). Adapted genes for producing GPP in a system of the invention are underlined.

Referring to FIG. 6, the isoprenoid diphosphate isomerase (IDI1) catalyzes the isomerization between DMAPP and IPP. This helps to improve the ratio of precursors favored for GPP production (Liu et al., J. Biotechnol., 2013, 168(4): 446-451). HMG-CoA was identified as a key rate-limiting step in the mevalonate pathway and overexpressing a truncated version of the gene, tHMG1, increases mevalonate supply for the pathway (Asadollahi et al., Biotechnol. Bioeng., 2010, 106(1):86-96; Scalcinati et al., Metab Eng, 2012. 14(2): p. 91-103). UPC2 is a transcription factor involved in the regulation of sterol biosynthesis and overexpressing a mutant, UPC2-1 enhances sterol uptake aerobically and consequently mevalonate production (Davies et al., Mol. Cell. Biol., 2005, 25(16):7375-7385).

The IDI1, tHMG1, and UPC2-1 genes were assembled together with the previously described GPP synthase, Erg20pWW, using the YeastFab system as described above into level 1 POTs and subsequently into a level 2 assembly plasmid (pCKL/pMKL) expressing auxotrophic marker LEU2. This allows the expression of genes for cannabinoids and isoprenoids to be maintained on separate plasmids in order to reduce the length of each plasmids assembled and transformed into the yeast strains.

Figure 7:
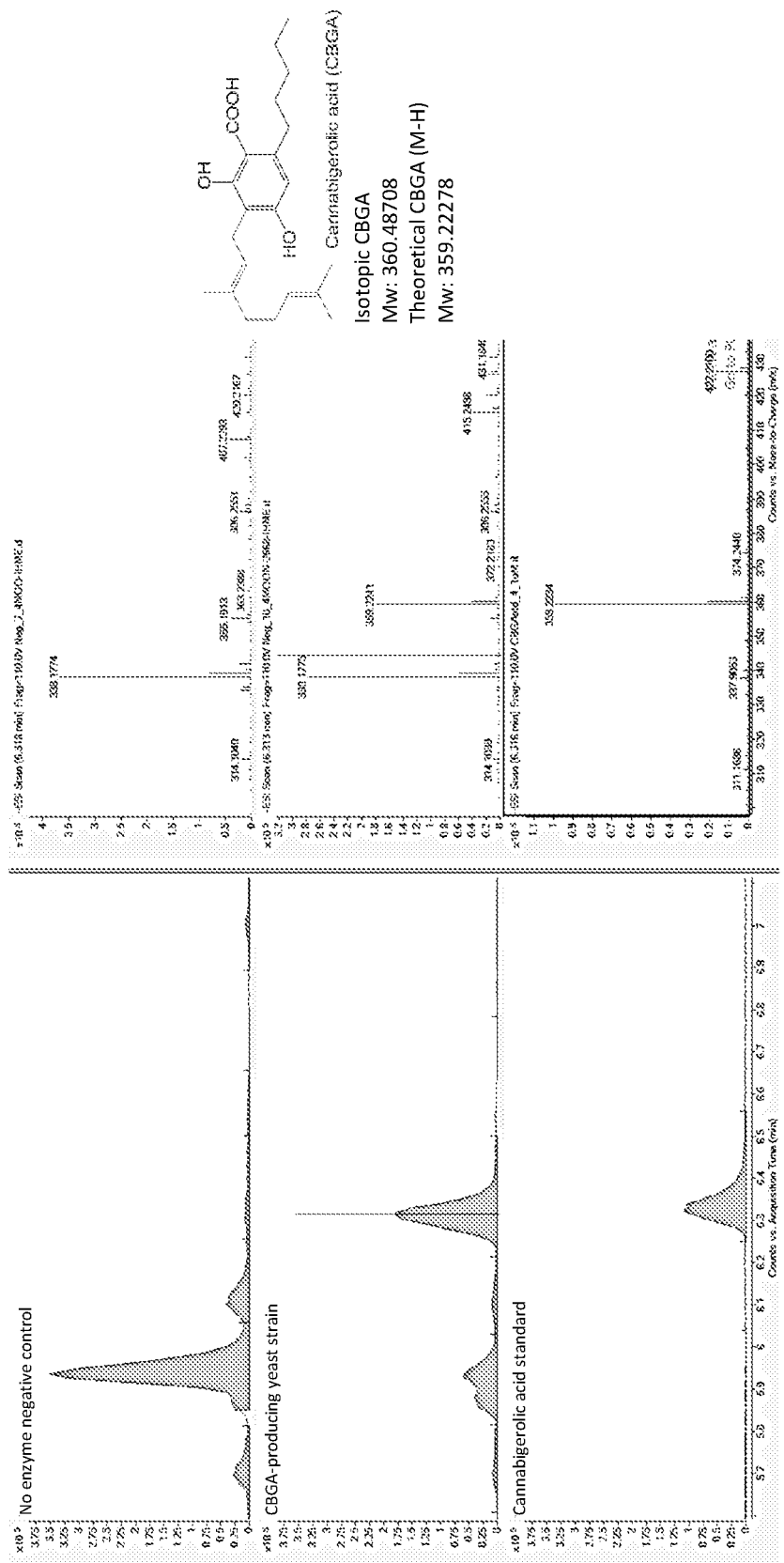
FIG. 7 shows extracted ion count and mass spectrum of the LC-MS analysis of cannabinoids produced in *S. cerevisiae*: negative control is construct 4MOON pMKU+Empty pCKL expressing only the cannabinoid genes (first row), construct 4MOON pMKU+IHUE pCKL, expressing the cannabinoid genes on pMKU vector and the mevalonate genes on pCKL (second row), and CBGA standard (last row).

A series of medium to strong promoters and terminators were individually assigned to overexpress the four genes for GPP production maintained on the pCKL/pMKL plasmid using the leucine auxotrophic marker (LEU2), while a different set of promoters and terminators were assigned to enzymes in the cannabinoid genes, maintained on a separate plasmid, pCKU/pMKU. See Table 3 below.

mants. The same bio-production procedure was carried out with constructs expressing both plasmids. Trace amounts of CBGA was detected intracellularly after conducting organic extraction of the lysed cell pellets. The results are shown in FIG. 7. Peaks with an elution time of ~6.7 mins and an m/z value of 359.2223 (ppm error of −1.34) correspond to that of the CBGA standard.

To further increase yields of CBGA produced by the pathway expressed in yeast, computational protein engineering was conducted on wild-type NphB to improve its selectivity in producing CBGA instead of the side product, 2-O-geranyl olivetolic acid. Four mutants, i.e., V49W/Y288A (SEQ ID NO: 8), V49W/Y288P (SEQ ID NO: 9), V49W/Y288A/Q295F (SEQ ID NO: 10), and V49W/Y288P/Q295F (SEQ ID NO: 11) were generated that are highly specific in prenylating olivetolic acid using the geranyl moiety from GPP at the correct site to produce CBGA. These mutants, which showed a significant increase in CBGA yield while producing no side products at all, were subsequently integrated into the pathway and CBGA titers improved significantly in vivo.

Example 6: Diversification of Cannabinoids

Branch-points in the cannabinoid biosynthetic pathway can be exploited to produce novel cannabinoid compounds. The promiscuous nature of the acyl-CoA ligase and polyketide synthase, i.e., OLS, used in the above constructs allows for the use of different short-medium chain fatty acids (C3-C10) as substrates instead of hexanoic acid (C6) to produce analogues of olivetolic acid. An example in *C. sativa* is the production of the cannabinoids tetrahydrocannabivarin (THCV) and cannabidivarinic acid (CBDVA), which are both produced by the same enzymes in the pathway. These cannabinoids, produced in minor quantities, use the polyketide precursor divarinic acid (DVA) instead of OLA. DVA, which has a C3 chain-length on $C_2$ of the aromatic ring instead of a C5 chain in OLA (see FIG. 8) is also produced by CsAAE1 enzyme in *C. sativa* using butyric acid (C4) as a starter unit instead of hexanoic acid (C6).

OLS and OAC were tested for substrate-promiscuity by using different starter units (C3-C10) instead of hexanoic acid (C6). The results are shown in FIG. 9.

TABLE 3

Promoters and terminators chosen for (A) ORFs from the mevalonate pathway maintained on pCKL/pMKL and (B) cannabinoid enzymes maintained on pCKU/pMKU.

| | | A: Construct to GPP | | | | B: Construct to CBGA | |
|---|---|---|---|---|---|---|---|
| POT | ORF | Promoter (Strength) | Terminator | POT | ORF | Promoter (Strength) | Terminator |
| 2 | IDI1 | GPM1 (Medium-Strong) | BNA4t | 2 | CoA Lig | RPL3p (Strong) | APL2t |
| 4 | tHMG1 | ACT1 (Medium-Strong) | PRX1t | 4 | MCS | PGK1p (Strong) | ATG10t |
| 6 | UPC2-1 | TDH2p (Medium) | YPT31t | 6 | OLS | TDH3p (Strong) | LSC2t |
| 7 | Erg20pWW | ENO2p (Strong) | EFM1t | 8 | OAC | TEF2p (Strong) | BUD32t |
| | | | | 9 | GOT/NphB | YEF3p (Medium)/ TPI1p (Strong) | CBR1t/EBS1t |

After assembly of both cannabinoid (pCKU/pMKU) and mevalonate genes was achieved, both plasmids were then transformed into the yeast strain BY4741 and grown in media lacking both uracil and leucine to select for transfor- Certain OLA analogues, i.e., (C3, C9, C10), were not produced in *S. cerevisiae* but were produced using the same biosynthetic pathway constructs in *E. coli*. See FIG. 10. This could be due to the presence of an endogenous acyl-CoA ligase present in *E. coli* and not in *S. cerevisiae* that is able to act on substrates such as propionic acid, nonanoic acid, and decanoic acid. Such an endogenous ligase can provide a primed acyl-CoA thioester as a substrate for the polyketide synthase OLS to act on.

Example 7: Further Diversification of Cannabinoid Production

The traditional method of precursor-directed combinatorial biosynthesis involves laborious screening of large libraries of substrates experimentally to detect if a new product was formed. In order to shorten the time and resources taken to identify favorable substrates, computational methods such as docking are employed as a prediction model to identify substrates that are able to fit into the binding pocket of the enzyme and that have favorable binding affinity to the active site. This facilitates screening of thousands of substrate libraries in a high-throughput manner to produce a ranked list of the most favorable substrates for experimental testing.

Figure 11:
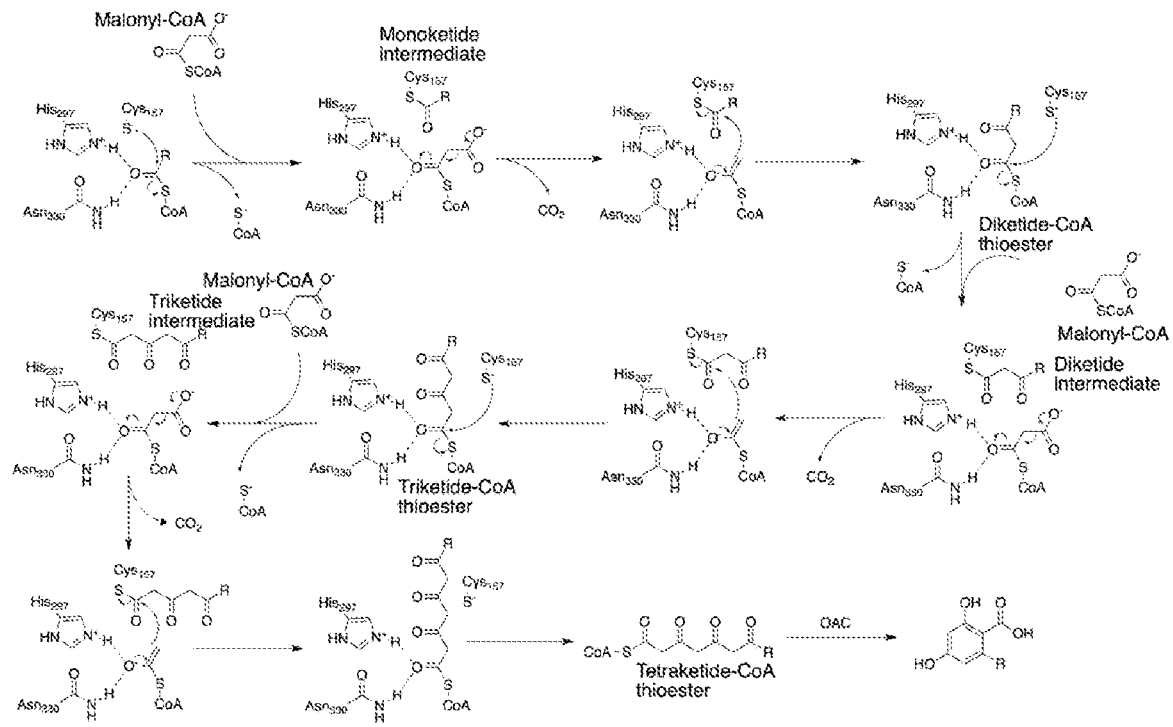
FIG. 11 shows a proposed OLS reaction mechanism.

Starting with a 2.2 Å resolution structure of OLS, the native substrates of this enzyme, hexanoyl-CoA and malonyl-CoA were first docked to serve as a positive control. OLS uses two substrates with different R-groups, shuttled by a CoA moiety into the active site; a hexanoyl-CoA starter unit and three malonyl-CoA extender units that iteratively extends the starter unit by attaching acetyl-ketone groups onto the hexanoyl-intermediate attached to Cys157 of OLS as illustrated in FIGS. 11 and 12.

Figure 12:
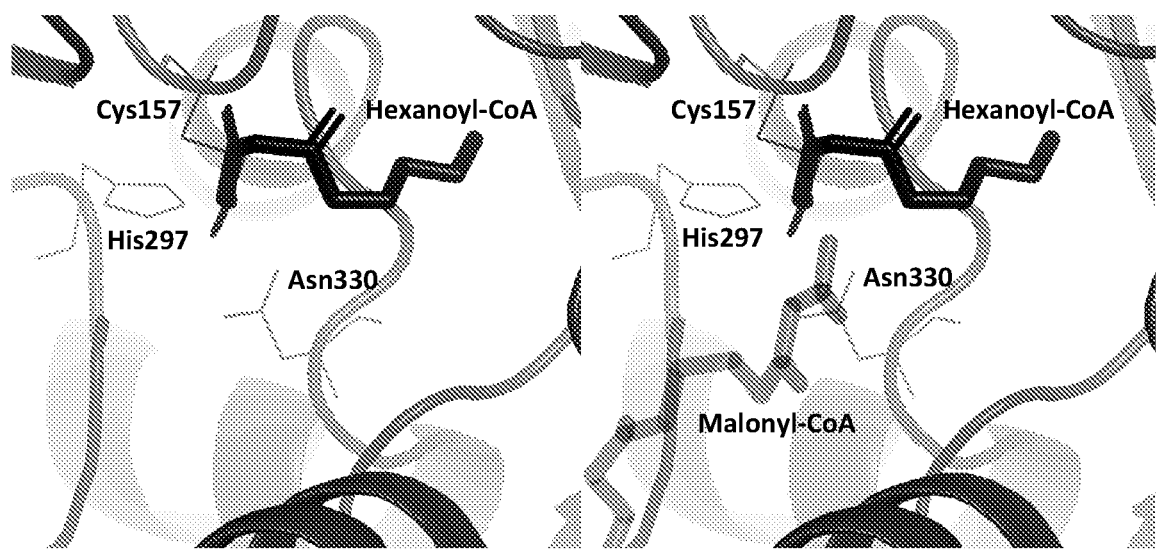
FIG. 12 shows protein structure of 3, 5-dioxodecanoyl-CoA intermediate (blue) docked into OLS structure (left panel) and 3, 5-dioxodecanoyl-CoA intermediate (blue) docked with superimposed malonyl-CoA unit (yellow).

In order to identify different starter units that can perform the same three elongation steps using an extender unit such as malonyl-CoA, the last intermediate state that is still covalently attached to OLS, i.e., a triketide intermediate, 3,5-dioxo decanoyl-CoA (after extension with two units of malonyl-CoA), was docked using GOLD (Groom et al.; see FIG. 12, left panel). This allows for delineation of the spatial constraints of accommodating the reaction mechanism of performing the multiple elongation steps. If the binding pocket is able to fit the last covalently attached intermediate state of the corresponding starter unit, it should be able to perform the first few rounds of elongation.

The last malonyl-CoA unit was then superimposed in using the crystallized malonyl-CoA ligand complexed with a homologous protein, chalcone synthase (CHS2) from the legume *Medicago sativa* (PDB code: 1CML) (Ferrer et al., Nat. Struct. Biol., 1999, 6(8):775-784). The superimposed malonyl-CoA ligand (yellow ligand in FIG. 12, right panel) was energy-minimized with the docked 3, 5-dioxodecanoyl-CoA intermediate (blue ligand in FIG. 12) in the OLS structure using the protein localization optimization program (PLOP) (Jacobson et al., J. Phys. Chem. B, 2002, 106(44):11673-11680; Jacobson et al., Proteins, 2004, 55(2):351-367; Zhao et al., Proteins, 2011, 79(10):2920-2935; Zhu et al., Proteins, 2006, 65(2):438-452; Zhu et al., J. Chem. Theory Comput., 2007, 3(6):2108-2119.). This last superimposition step identifies starter units that may have a bulkier R-group and result in steric clashes in the OLS binding pocket with the last malonyl-CoA ligand and thereby preventing the last extension step. These candidates are subsequently eliminated. As observed from the positive control in FIG. 12 left and right panels, the position of both the docked 3, 5-dioxodecanoyl-CoA intermediate from the hexanoyl-CoA starter unit and the energy-minimized malonyl-CoA primes the two substrates together for the last extension step.

As mentioned above a library of 70 acyl-CoA starter units (Go et al.) and 12 different acyl-CoA extender units (Go et al., ACS Catalysis, 2015, 5(7):4033-4042) is available. Collectively, this equates to a total of 840 combinations of starter and extender units that can serve as substrates for type III polyketide synthases such as OLS. These are used as the substrate library to be docked into the OLS structure. The outputs of the docking results are ranked accordingly and compared with experimental results to check for accuracy of the prediction model. This experimental testing of substrate promiscuity of OLS will produce olivetolic acid analogues with a varied chain length or R-group that can then be used to produce cannabinoids with a varied R-group on $C_2$ of the olivetolate-cannabinoid scaffold (see FIG. 8).

Example 8: Protein Engineering

Protein engineering is a long established field of engineering enzymes to specific desired characteristics. Yet, without a good selection method, the vast amount of sequence space requires a prediction model in selecting mutants to display product diversity.

As mentioned above, NphB mutants were designed with a high selectivity for producing CBGA without any side product. Different NphB mutants were designed such that this prenyltransferase accepts different substrates and thus produces a different desired cannabinoid product.

The last cyclization step in the cannabinoid biosynthetic pathway cyclizes the C10 chain previously transferred from GPP (see FIG. 1). CBGA analogues are produced with a longer prenyl chain length that will serve as a precursor to more diverse structures due to the longer chain length available. A C15 chain length analogue of GPP, farnesyl pyrophosphate (FPP) and a C20 chain length analogue, geranylgeranyl pyrophosphate (GGPP) are used as suitable replacements for GPP to produce CBGA analogues with a C15 or C20 prenyl chain. Using the same computational protein engineering approach, specific mutations on the NphB enzyme can be identified that afford a better affinity for the longer FPP and GPP. These mutations can be tested to subsequently produce CBGA analogues.

An orthologue library of cannabinoid synthases are screened against CBGA-analogue producing strains to test for production of varied cannabinoid chemical structures that are subsequently tested for bioactivity.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A recombinant cell of *Saccharomyces cerevisiae*, comprising in its genome a plurality of nucleic acids, wherein at least one of the plurality of nucleic acids encodes a prenyltransferase comprising an amino acid sequence selected from the group consisting of SEQ ID Nos: 8-11, and wherein a cannabinoid is produced by the recombinant cell in the presence of a cannabinoid precursor substrate.

2. The recombinant cell of claim 1, wherein the cannabinoid precursor substrate is selected from a cinnamic acid, a phenylpropanoic acid, a benzoic acid, a phenylacetic acid, a naphthalene carboxylic acid, a quinoline carboxylic acid, a pyridine carboxylic acid, a saturated aliphatic acid, an unsaturated aliphatic acid and a malonic acid;

wherein the cinnamic acid is selected from cinnamic acid, 2-fluorocinnamic acid, 3-fluorocinnamic acid, 4-fluorocinnamic acid, α-fluorocinnamic acid, 2-chlorocinnamic acid, 3-chlorocinnamic acid, 4-chlorocinnamic acid, 4-methylcinnamic acid, α-methylcinnamic acid, 2-hydroxy-cinnamic acid, 4-hydroxycinnamic acid, 2-methoxycinnamic acid, 4-methoxy-cinnamic acid, 2,4-dimethoxycinnamic acid, 3,4-dimethoxycinnamic acid, 3-chloro-4-methoxycinnamic acid, 4-hydroxy-3-methoxycinnamic acid, 4-hydroxy-3,5-dimethoxycinnamic acid, 4-nitrocinnamic acid;

wherein the phenylpropanoic acid is selected from 3-phenylpropanoic acid, 2-hydroxy-3-phenylpropanoic acid, 3-(2-bromophenyl) propanoic acid, 3-(2-methoxyphenyl) propanoic acid, 3-(3-methoxyphenyl) propanoic acid, 3-(4-methoxyphenyl) propanoic acid, 3-(3-chlorophenyl) propanoic acid, 3-(4-fluorophenyl) propanoic acid, 3-(3,4-dihydroxyphenyl) propanoic acid, 3-(3,5)-dichlorophenyl) propanoic acid, 3-(3,5)-difluorophenyl) propanoic acid, 2-hydroxy-3-(4-fluoro-phenyl) propanoic acid, 3-(3-chloro-4-methoxyphenyl) propanoic acid;

wherein the benzoic acid is selected from benzoic acid, 2-fluorobenzoic acid, 3-fluorobenzoic acid, 4-fluorobenzoic acid, 2-chlorobenzoic acid, 3-chlorobenzoic acid, 4-chlorobenzoic acid, 2-bromo-benzoic acid, 3-bromobenzoic acid, 4-bromobenzoic acid, 2-iodobenzoic acid, 3-iodobenzoic acid, 4-iodobenzoic acid, 2-aminobenzoic acid, 3-aminobenzoic acid, 4-aminobenzoic acid, 2-acetoxy benzoic acid, 2-hydroxy-3,5-diiodo benzoic acid, 2-hydroxybenzoic acid, 2-methoxybenzoic acid, 2-methylbenzoic acid, 2,3-dihydroxybenzoic acid, 2,4-dihydroxybenzoic acid, 2,5-dihydroxy benzoic acid, 2,6-difluorobenzoic acid, 2,6-dimethylbenzoic acid, 3,4-dimethoxy benzoic acid, 3,5-dihydroxybenzoic acid, 3,4,5-trihydroxybenzoic acid, 3,5-dihydroxy-4-methoxybenzoic acid, 3,5-dimethylbenzoic acid, 4-amino-2-hydroxybenzoic acid;

wherein the phenylacetic acid is selected from phenylacetic acid, 2-hydroxyphenylacetic acid, 4-hydroxyphenylacetic acid, 4-methoxyphenylacetic acid, phenoxyacetic acid, 4-fluorophenoxyacetic acid, 2,4-dichlorophenoxyacetic acid, phenyl pyruvic acid;

wherein the naphthalene, quinoline, and pyridine carboxylic acids are selected from 1-naphthalenecarboxylic acid, 2-naphthalenecarboxylic acid, 2-quinoline carboxylic acid, 3-quinolinecarboxylic acid, 4-quinolinecarboxylic acid, isoquinoline-1-carboxylic acid, 2-quinoxalinecarboxylic acid, pyridine-2-carboxylic acid, pyridine-3-carboxylic acid, pyridine-4-carboxylic acid, 2-chloropyridine-3-carboxylic acid, pyrazinecarboxylic acid;

wherein the saturated aliphatic acid is selected from acetic acid, propanoic acid, butanoic acid, pentanoic acid, hexanoic acid, heptanoic acid, octanoic acid, nonanoic acid, decanoic acid, pyruvic acid, acetoacetic acid, succinic acid, pimelic acid;

wherein the unsaturated aliphatic acids comprises 2-propenoic acid, 2-methyl-2-propenoic acid, 2-butenoic acid, 3-butenoic acid, 2-methyl-2-butenoic acid, 3-methyl-2-butenoic acid, 2-pentenoic acid, 3-pentenoic acid, 4-pentenoic acid, 2-hexenoic acid, 3-hexenoic acid, 5-hexenoic acid, 3-methyl-4-pentenoic acid, shikimic acid; wherein the malonic acid is selected from malonic acid, hydroxymalonic acid, methylmalonic acid, ethylmalonic acid, isopropylmalonic acid, n-butylmalonic acid, cyclopentylmalonic acid, allylmalonic acid, phenylmalonic acid, 3-thiophenemalonic acid, benzylmalonic acid.

3. The recombinant cell of claim 2, wherein the cannabinoid precursor substrate is butyric acid, valeric acid, hexanoic acid, heptanoic acid, or octanoic acid.

4. A method for producing a cannabinoid, the method comprising contacting the recombinant cell of claim 1 with a cannabinoid precursor substrate and culturing the recombinant cell.

5. The method of claim 4, wherein the cannabinoid precursor substrate is selected from a cinnamic acid, a phenylpropanoic acid, a benzoic acid, a phenylacetic acid, a naphthalene carboxylic acid, a quinoline carboxylic acid, a pyridine carboxylic acid, a saturated aliphatic acid, an unsaturated aliphatic acid and a malonic acid;

wherein the cinnamic acid is selected from cinnamic acid, 2-fluorocinnamic acid, 3-fluorocinnamic acid, 4-fluorocinnamic acid, α-fluorocinnamic acid, 2-chlorocinnamic acid, 3-chlorocinnamic acid, 4-chlorocinnamic acid, 4-methylcinnamic acid, α-methylcinnamic acid, 2-hydroxy-cinnamic acid, 4-hydroxycinnamic acid, 2-methoxycinnamic acid, 4-methoxy-cinnamic acid, 2,4-dimethoxycinnamic acid, 3,4-dimethoxycinnamic acid, 3-chloro-4-methoxycinnamic acid, 4-hydroxy-3-methoxycinnamic acid, 4-hydroxy-3,5-dimethoxycinnamic acid, 4-nitrocinnamic acid;

wherein the phenylpropanoic acid is selected from 3-phenylpropanoic acid, 2-hydroxy-3-phenylpropanoic acid, 3-(2-bromophenyl) propanoic acid, 3-(2-methoxyphenyl) propanoic acid, 3-(3-methoxyphenyl) propanoic acid, 3-(4-methoxyphenyl) propanoic acid, 3-(3-chlorophenyl) propanoic acid, 3-(4-fluorophenyl) propanoic acid, 3-(3,4-dihydroxyphenyl) propanoic acid, 3-(3,5)-dichlorophenyl) propanoic acid, 3-(3,5)-difluorophenyl) propanoic acid, 2-hydroxy-3-(4-fluoro-phenyl) propanoic acid, 3-(3-chloro-4-methoxyphenyl) propanoic acid;

wherein the benzoic acid is selected from benzoic acid, 2-fluorobenzoic acid, 3-fluorobenzoic acid, 4-fluorobenzoic acid, 2-chlorobenzoic acid, 3-chlorobenzoic acid, 4-chlorobenzoic acid, 2-bromo-benzoic acid, 3-bromobenzoic acid, 4-bromobenzoic acid, 2-iodobenzoic acid, 3-iodobenzoic acid, 4-iodobenzoic acid, 2-aminobenzoic acid, 3-aminobenzoic acid, 4-aminobenzoic acid, 2-acetoxy benzoic acid, 2-hydroxy-3,5-diiodo benzoic acid, 2-hydroxybenzoic acid, 2-methoxybenzoic acid, 2-methylbenzoic acid, 2,3-dihydroxybenzoic acid, 2,4-dihydroxybenzoic acid, 2,5-dihydroxy benzoic acid, 2,6-difluorobenzoic acid, 2,6-dimethylbenzoic acid, 3,4-dimethoxy benzoic acid, 3,5-dihydroxybenzoic acid, 3,4,5-trihydroxybenzoic acid, 3,5-dihydroxy-4-methoxybenzoic acid, 3,5-dimethylbenzoic acid, 4-amino-2-hydroxybenzoic acid;

wherein the phenylacetic acid is selected from phenylacetic acid, 2-hydroxyphenylacetic acid, 4-hydroxyphenylacetic acid, 4-methoxyphenylacetic acid, phenoxyacetic acid, 4-fluorophenoxyacetic acid, 2,4-dichlorophenoxyacetic acid, phenyl pyruvic acid;

wherein the naphthalene, quinoline, and pyridine carboxylic acids are selected from 1-naphthalenecarboxylic acid, 2-naphthalenecarboxylic acid, 2-quinoline carboxylic acid, 3-quinolinecarboxylic acid, 4-quinolinecarboxylic acid, isoquinoline-1-carboxylic acid, 2-quinoxalinecarboxylic acid, pyridine-2-carboxylic acid, pyridine-3-carboxylic acid, pyridine-4-carboxylic acid, 2-chloropyridine-3-carboxylic acid, pyrazinecarboxylic acid;

wherein the saturated aliphatic acid is selected from acetic acid, propanoic acid, butanoic acid, pentanoic acid, hexanoic acid, heptanoic acid, octanoic acid, nonanoic acid, decanoic acid, pyruvic acid, acetoacetic acid, succinic acid, pimelic acid;

wherein the unsaturated aliphatic acids comprises 2-propenoic acid, 2-methyl-2-propenoic acid, 2-butenoic acid, 3-butenoic acid, 2-methyl-2-butenoic acid, 3-methyl-2-butenoic acid, 2-pentenoic acid, 3-pentenoic acid, 4-pentenoic acid, 2-hexenoic acid, 3-hexenoic acid, 5-hexenoic acid, 3-methyl-4-pentenoic acid, shikimic acid; wherein the malonic acid is selected from malonic acid, hydroxymalonic acid, methylmalonic acid, ethylmalonic acid, isopropylmalonic acid, n-butylmalonic acid, cyclopentylmalonic acid, allylmalonic acid, phenylmalonic acid, 3-thiophenemalonic acid, benzylmalonic acid.

6. The method of claim 5, wherein the cannabinoid precursor substrate is butyric acid, valeric acid, hexanoic acid, heptanoic acid, or octanoic acid.

* * * * *